(12) United States Patent
Akthar et al.

(10) Patent No.: US 12,536,170 B1
(45) Date of Patent: *Jan. 27, 2026

(54) JOIN OPTIMIZATION

(71) Applicant: Progress Software Corporation, Burlington, MA (US)

(72) Inventors: Mohammed Sayeed Akthar, Hyderabad (IN); Sunil Jardosh, Hyderabad (IN); Ram Krushna Mishra, Hyderabad (IN)

(73) Assignee: Progress Software Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,897

(22) Filed: Feb. 22, 2023

Related U.S. Application Data

(63) Continuation of application No. 16/457,536, filed on Jun. 28, 2019, now Pat. No. 11,615,085.

(51) Int. Cl.
    *G06F 16/2453* (2019.01)
    *G06F 16/22* (2019.01)

(52) U.S. Cl.
    CPC .... *G06F 16/24537* (2019.01); *G06F 16/2246* (2019.01); *G06F 16/2282* (2019.01); *G06F 16/24544* (2019.01); *G06F 16/24545* (2019.01)

(58) Field of Classification Search
    CPC .......... G06F 16/24537; G06F 16/2246; G06F 16/2282; G06F 16/24544; G06F 16/24545
    USPC ....................................................... 707/714
    See application file for complete search history.

(56) References Cited

U.S. PATENT DOCUMENTS

| | | | | |
|---|---|---|---|---|
| 5,960,428 | A | * | 9/1999 | Lindsay ............ G06F 16/24544 |
| 5,963,933 | A | * | 10/1999 | Cheng ............... G06F 16/24537 707/999.005 |
| 6,493,701 | B2 | * | 12/2002 | Ponnekanti ....... G06F 16/24544 707/999.005 |
| 6,618,719 | B1 | * | 9/2003 | Andrei .............. G06F 16/24547 |
| 8,126,870 | B2 | * | 2/2012 | Chowdhuri ....... G06F 16/24532 707/713 |
| 8,332,385 | B2 | * | 12/2012 | Moor ...................... G06F 8/437 707/713 |
| 8,332,389 | B2 | * | 12/2012 | Bestgen ............ G06F 16/24544 707/718 |

(Continued)

OTHER PUBLICATIONS

Ho-Hyun Park et al., "Spatial Query Optimization Utilizing Early Separated Filter and Refinement Strategy", Information Systems, vol. 25, No. 1, Mar. 2000, pp. 1-22. (Year: 2000).*

*Primary Examiner* — Phuong Thao Cao
(74) *Attorney, Agent, or Firm* — Patent Law Works LLP

(57) ABSTRACT

A system and method for efficient query processing including determining a first intermediate result set by applying a set operation to a first result set and a second result set, the join query including a join operation on a first table and a second table and including a first condition and a second condition, the first condition based on a first index of the second table, the second condition based on a second index of the second table, the first result set obtained using a first index scan of the second table, the second result set obtained using a second index scan of the second table; determining a second intermediate result set by performing a scan of the first table; determining a final result set by applying a join to the second intermediate result set and at least a portion of the first intermediate result set.

20 Claims, 15 Drawing Sheets

(56) References Cited

U.S. PATENT DOCUMENTS

| | | | |
|---|---|---|---|
| 8,554,761 B1 | 10/2013 | Ahmed | |
| 9,965,516 B2* | 5/2018 | Ahmed | G06F 16/24544 |
| 10,664,474 B1* | 5/2020 | Chunduru | G06F 16/24544 |
| 10,726,010 B2* | 7/2020 | Ahmed | G06F 16/24544 |
| 11,036,732 B2* | 6/2021 | Beavin | G06F 16/24537 |
| 11,055,284 B1* | 7/2021 | Vogelsgesang | G06F 16/2454 |
| 2002/0078015 A1* | 6/2002 | Ponnekanti | G06F 16/2456 |
| 2004/0006561 A1* | 1/2004 | Nica | G06F 16/24544 |
| 2006/0047646 A1 | 3/2006 | Maluf | |
| 2006/0167865 A1* | 7/2006 | Andrei | G06F 16/24544 |
| 2006/0218123 A1* | 9/2006 | Chowdhuri | G06F 16/24532 |
| 2008/0147599 A1* | 6/2008 | Young-Lai | G06F 16/24532 |
| 2009/0006447 A1 | 1/2009 | Balmin | |
| 2010/0250518 A1* | 9/2010 | Bruno | G06F 16/24 707/718 |
| 2011/0082854 A1* | 4/2011 | Eidson | G06F 16/2453 707/E17.017 |
| 2011/0137890 A1 | 6/2011 | Bestgen | |
| 2011/0161352 A1* | 6/2011 | de Castro Alves | G06F 16/25 707/769 |
| 2011/0184933 A1 | 7/2011 | Colby | |
| 2011/0282864 A1* | 11/2011 | Collins | G06F 16/24532 707/719 |
| 2011/0302194 A1* | 12/2011 | Gonzalez | G06F 16/29 707/769 |
| 2012/0078880 A1 | 3/2012 | Kirk | |
| 2014/0067789 A1 | 3/2014 | Ahmed | |
| 2016/0179890 A1* | 6/2016 | Chiang | G06F 16/24544 707/714 |
| 2016/0196306 A1* | 7/2016 | Beavin | G06F 16/2255 707/714 |
| 2016/0350375 A1* | 12/2016 | Das | G06F 16/2456 |
| 2018/0101573 A1* | 4/2018 | Sheng | G06F 16/24544 |
| 2018/0121507 A1* | 5/2018 | Li | G06F 16/24545 |
| 2018/0276275 A1* | 9/2018 | Dou | G06F 16/24544 |
| 2018/0285415 A1 | 10/2018 | Beavin | |
| 2018/0336246 A1* | 11/2018 | Dasam | G06F 16/24545 |
| 2019/0057133 A1* | 2/2019 | Chainani | G06F 16/24564 |
| 2019/0188299 A1* | 6/2019 | Al-Kateb | G06F 16/2456 |
| 2019/0236188 A1* | 8/2019 | McKenna | G06F 16/24565 |
| 2020/0242119 A1* | 7/2020 | Matthew | G06F 16/24544 |
| 2020/0327127 A1* | 10/2020 | Nanal | G06F 16/2453 |
| 2023/0205760 A1* | 6/2023 | McHugh | G06F 16/2379 707/696 |

\* cited by examiner

Augmented Nested Loop (ANL) Query Scenario 1:

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);  ⌐— 402

//Assume the following indices are created
CREATE INDEX Tab2IdxFld1 ON Tab2(Fld1);
CREATE INDEX Tab2IdxFld2 ON Tab2(Fld2);  ⌐— 404
CREATE INDEX Tab2IdxFld2-3 (Fld2, Fld3);

//Assume that the following query is received
SELECT Tab1.Col1, Tab2.Fld1
FROM Tab1 INNER JOIN Tab2 ON Tab1.Col1 = Tab2.Fld1  ⌐— 406

Example Optimization Plan Using ANL

TABLE SCAN on Tab1
    INDEX SCAN on Tab2
    Augmented Nested LOOP join on Tab1 and Tab2 using join condition  ⌐— 408
        Tab1.Col1 = Tab2.Fld1

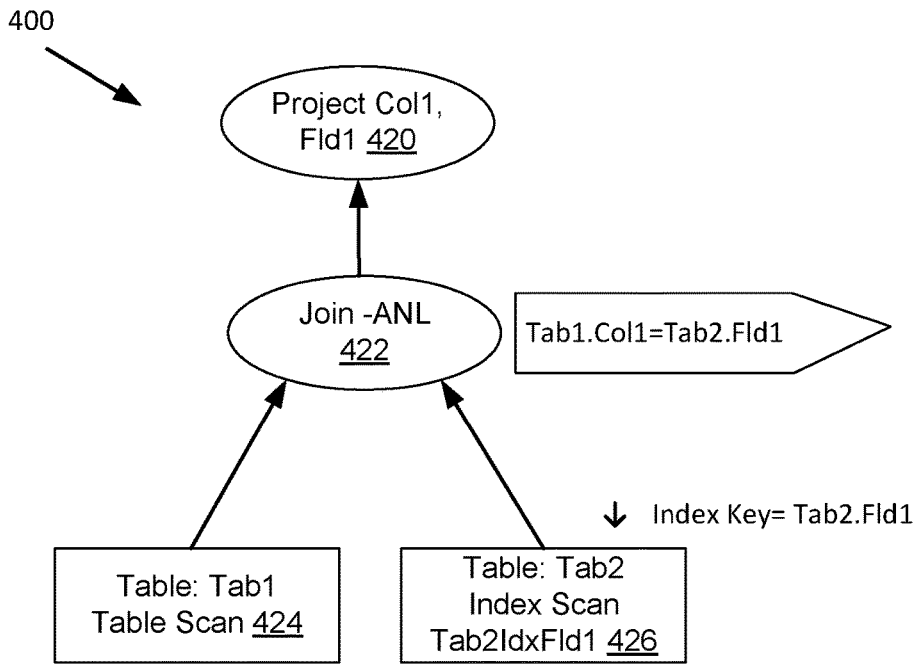

Figure 4

Nested Loop (NL) Query Scenario 2: ⟵ 502

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);  ⟵ 504
CREATE INDEX Tab2IdxFld2-3 (Fld2, Fld3);

//Assume that the following query is received
SELECT Tab1.Col1, Tab2.Fld1
FROM   Tab1 INNER JOIN Tab2 ON Tab1.Col3 = Tab2.Fld3  ⟵ 506

Example Optimization Plan Using NL

TABLE SCAN on Tab1
    TABLE SCAN on Tab2
    Nested LOOP join on Tab1 and Tab2 using join condition   ⟵ 508
    Tab1.Col1 = Tab2.Fld1

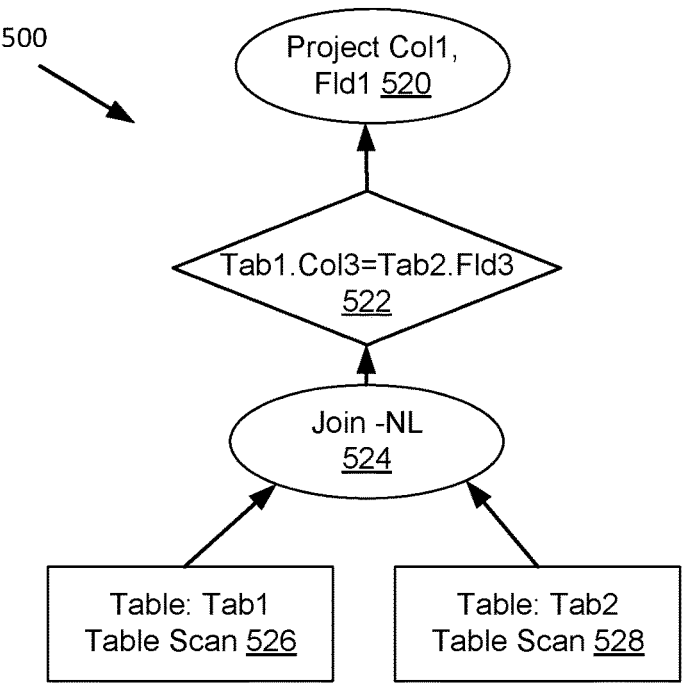

Figure 5

Query Scenario 3:                                    ⌐ 602

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);      ⌐ 604
CREATE INDEX Tab2IdxFld2-3 (Fld2, Fld3);

//Assume that the following query is received
SELECT Tab1.Col1, Tab2.Fld2
FROM   Tab1 INNER JOIN Tab2 ON Tab1.Col1 = Tab2.Fld1     ⌐ 606
                       OR Tab1.Col2 = Tab2.Fld2

600

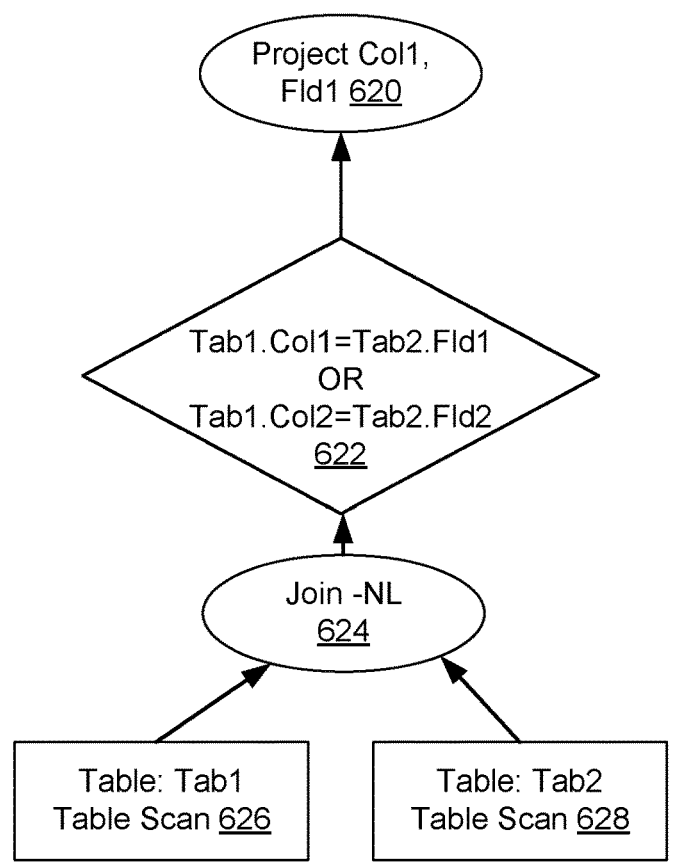

Figure 6
-Prior Art-

Query Scenario 4: ⌐— 702

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);   ⌐— 704
CREATE INDEX Tab2IdxFld2-3 (Fld2, Fld3);

//Assume the following query is received
SELECT Tab1.Col1, Tab2.Fld2
FROM   Tab1 INNER JOIN Tab2 ON Tab1.Col1 = Tab2.Fld1   ⌐— 706
                            OR Tab1.Col2 = Tab2.Fld2

//The query may be re-written as:
SELECT Tab1.Col1, Tab2.Fld2, Tab2.ROWID
FROM   Tab1 INNER JOIN Tab2 ON Tab1.Col1 = Tab2.Fld1 ⌐— 708a
                            UNION
SELECT Col1, Fld2, Tab2.ROWID
FROM   Tab1 INNER JOIN Tab2 ON Tab1.Col2 = Tab2.Fld2 ⌐— 708b

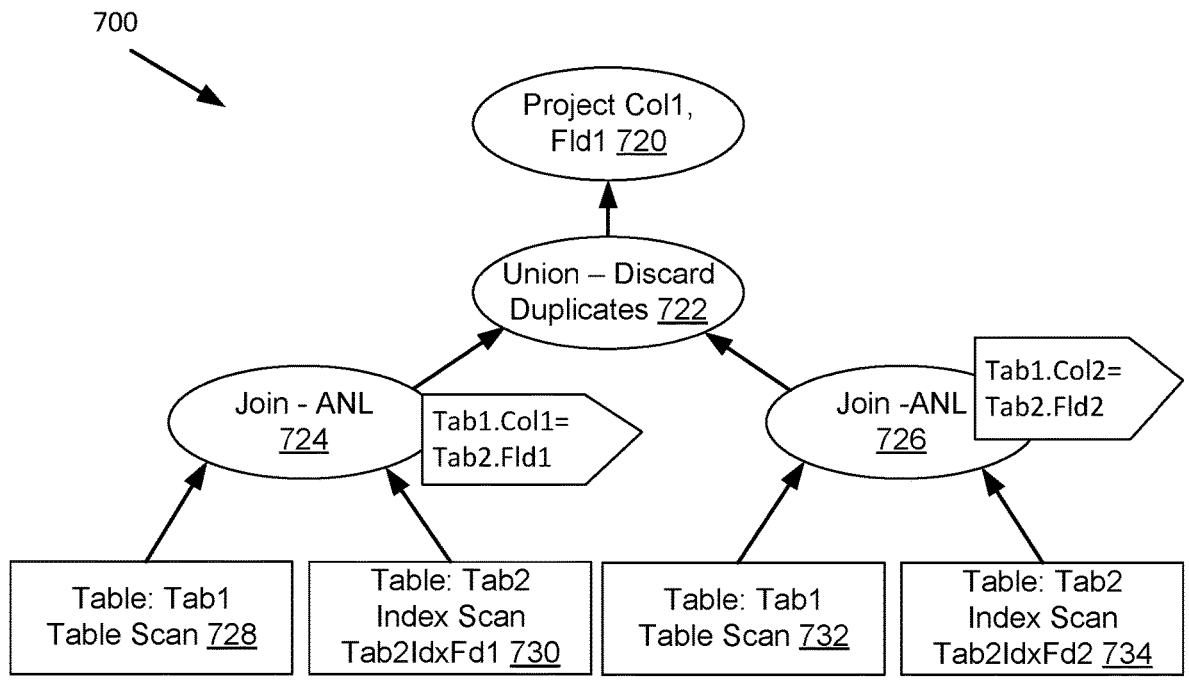

Figure 7
-Prior Art-

Query Scenario 5:  ⌐— 802

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);    ⌐— 804
CREATE INDEX Tab2IdxFld2-3 (Fld2, Fld3);

//Assume the following query is received
SELECT Tab1.Col1, Tab2.Fld2
FROM Tab1 INNER JOIN Tab2 ON Tab1.Col1 = Tab2.Fld1    ⌐— 806
           OR Tab1.Col2 = Tab2.Fld2

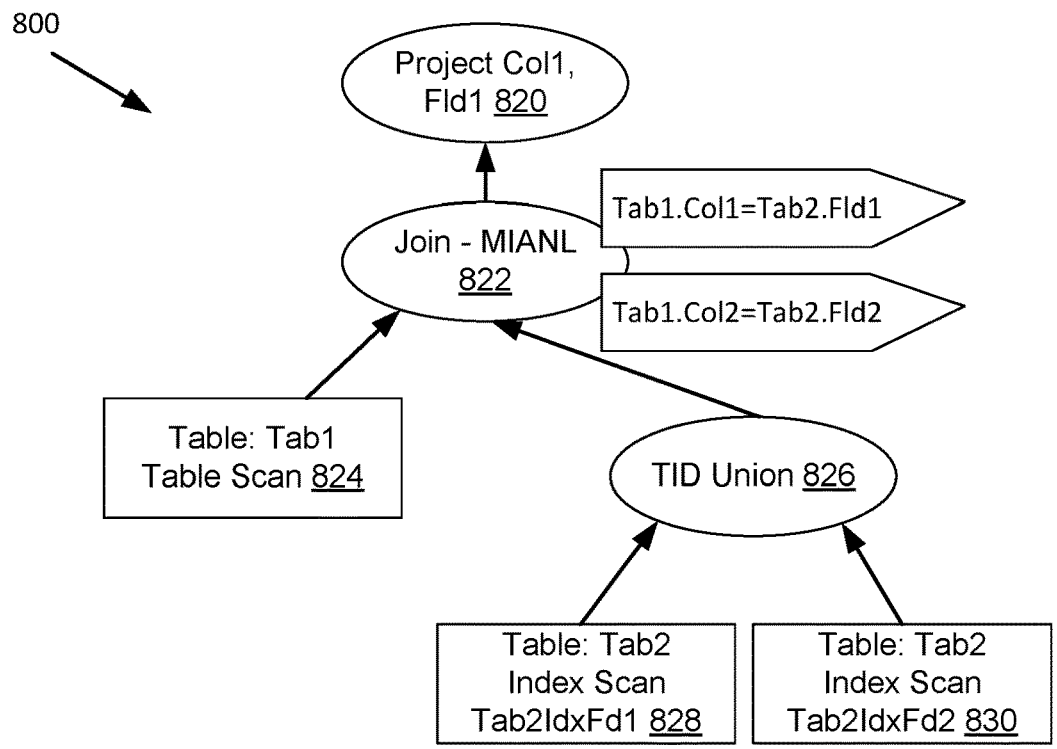

Figure 8

Query Scenario 6: ⌐ 902

```
//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);           ⌐ 904
CREATE INDEX Tab2IdxFld2-3 (Fld2, Fld3);

//Assume the following query is received
SELECT Tab1.Col1, Tab2.Fld2
FROM   Tab1 INNER JOIN Tab2 ON Tab1.Col1 = Tab2.Fld1           ⌐ 906
                           AND Tab1.Col2 = Tab2.Fld2
```

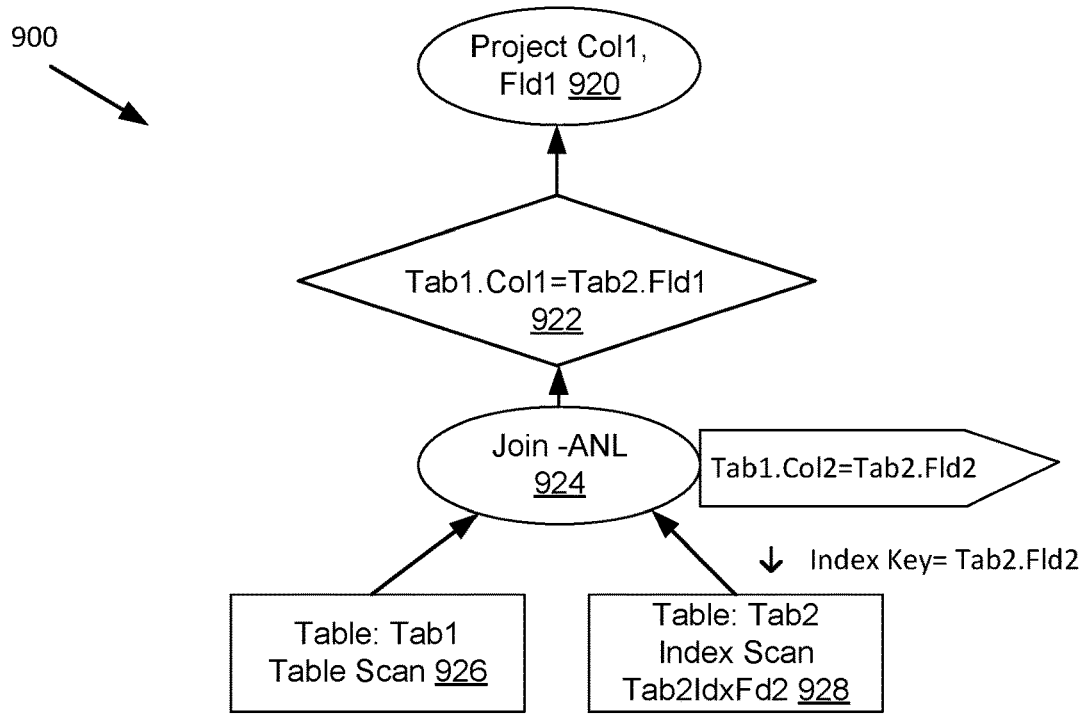

Figure 9
-Prior Art-

Query Scenario 7:  ⌐— 1002

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);   ⌐— 1004
CREATE INDEX Tab2IdxFld2-3 (Fld2, Fld3);

//Assume the following query is received
SELECT Tab1.Col1, Tab2.Fld2
FROM   Tab1 INNER JOIN Tab2 ON Tab1.Col1 = Tab2.Fld1   ⌐— 1006
                AND Tab1.Col2 = Tab2.Fld2

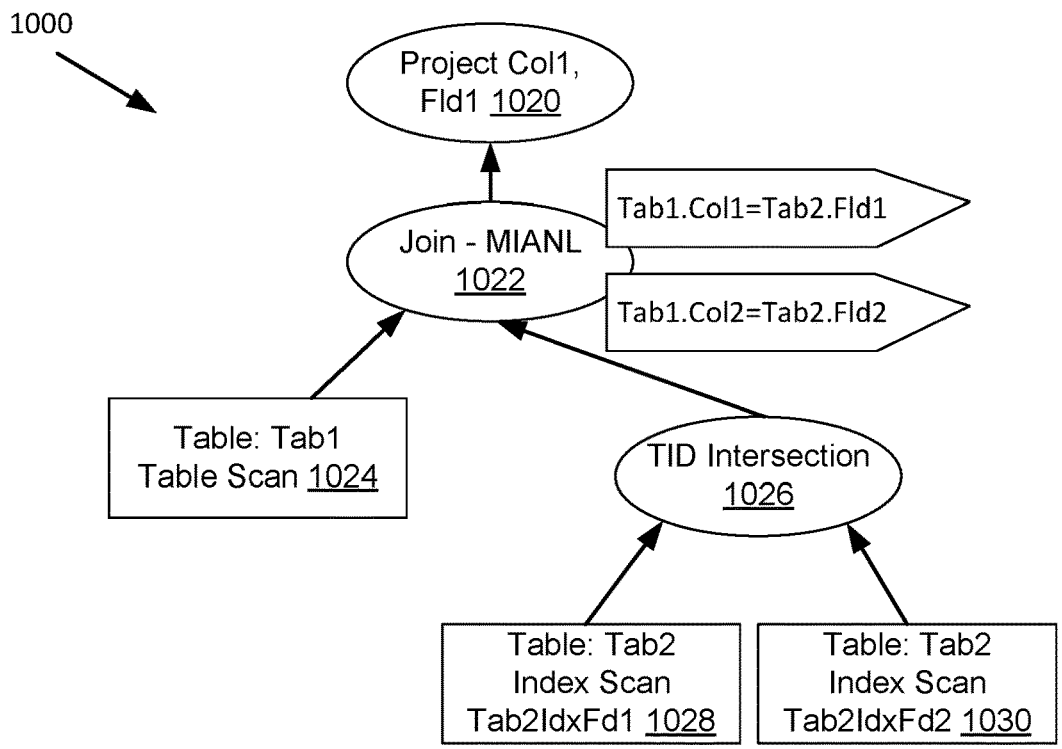

Figure 10

Query Scenario 8:  ⸺ 1102

//Assume the following tables are created in the database.
CREATE TABLE Tab1 (Col1 INTEGER, Col2 INTEGER, Col3 INTEGER)
CREATE TABLE Tab2 (Fld1 INTEGER, Fld2 INTEGER, Fld3 INTEGER);

//Assume the following indices are created
CREATE INDEX Tab2IdxFld1 ON Tab2(Fld1);
CREATE INDEX Tab2IdxFld2 ON Tab2(Fld2);  ⸺ 1104
CREATE INDEX Tab2IdxFld2-3 (Fld2, Fld3);

//Assume the following query is received
SELECT Col1, Fld2
FROM   Tab1 INNER JOIN Tab2 ON  ⸺ 1106
       (Tab1.Col1 = Tab2.Fld1 AND Tab1.Col2=Tab2.Fld3)
                          OR
       (Tab1.Col2 = Tab2.Fld1 AND Tab1.Col3=Tab2.Fld2)

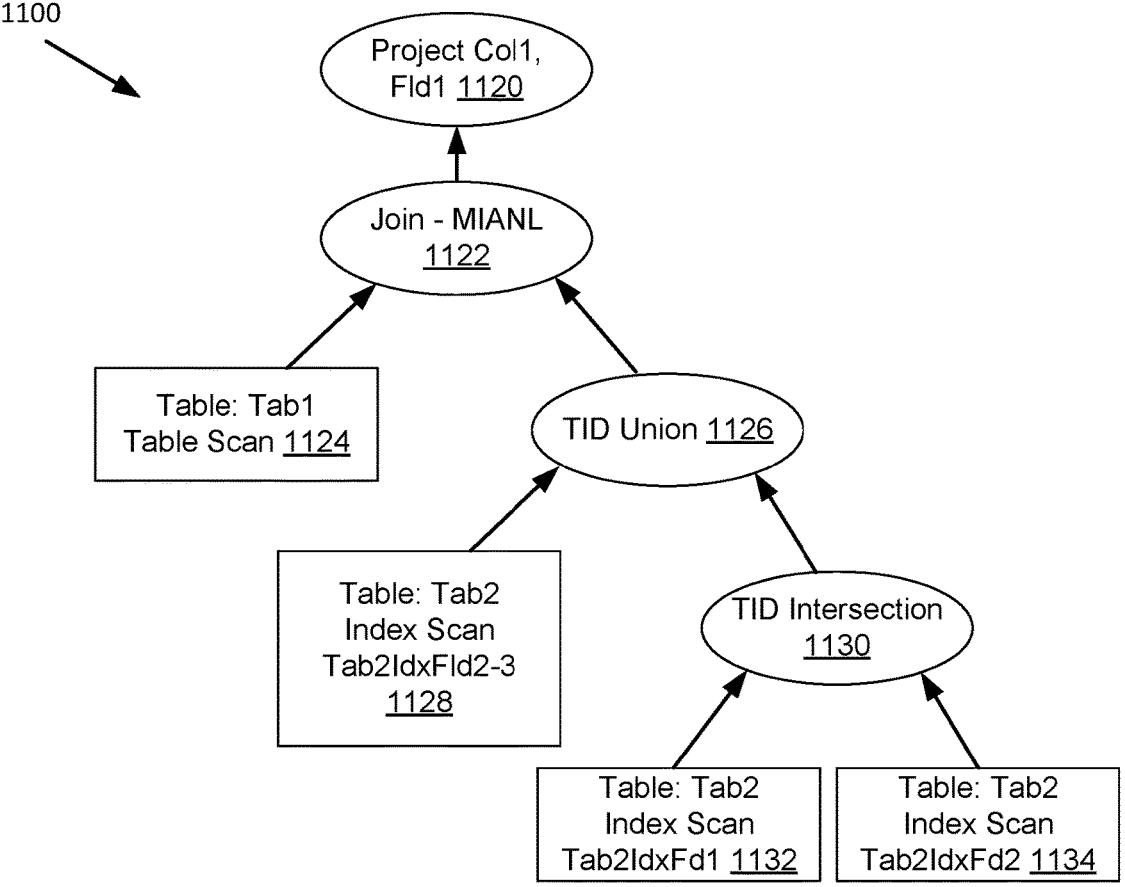

Figure 11

Query Scenario 9:

```
//Assume the following tables are created in the database.
CREATE TABLE Tab1 (Col1 INTEGER, Col2 INTEGER)
CREATE TABLE Tab2 (Fld1 INTEGER, Fld2 INTEGER);
```
⎯⎯ 1202

```
//Assume the following indices are created
CREATE INDEX Tab2IdxFld1 ON Tab2(Fld1);
```
⎯⎯ 1204

```
//Assume the following query is received
SELECT Tab1.Col1, Tab2.Fld2
FROM   Tab1 INNER JOIN Tab2 ON Tab1.Col1 = Tab2.Fld1
                            OR Tab1.Col2 = Tab2.Fld2
```
⎯⎯ 1206

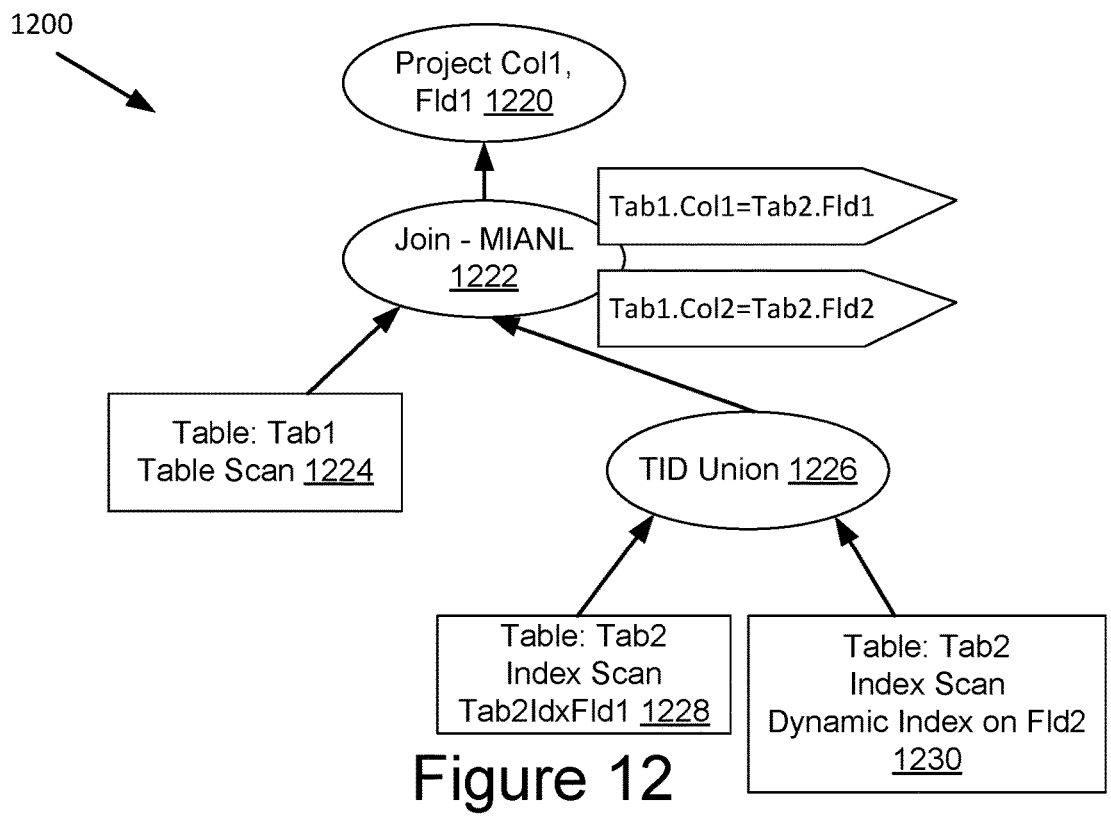

Figure 12

JOIN OPTIMIZATION

CROSS REFERENCE TO RELATED APPLICATIONS

This application is a continuation of U.S. patent application Ser. No. 16/457,536, filed Jun. 28, 2019, entitled "Join Optimization using Multi-Index Augmented Nested Loop Join Method", now issued as U.S. Pat. No. 11,615,085, which is hereby incorporated by reference in its entirety.

FIELD OF INVENTION

The present disclosure relates to query systems. Specifically, the present disclosure relates to providing optimization and efficient processing of queries.

BACKGROUND

Over the years, the cost of storing data has been reduced as memory technologies have advanced. This reduction in the cost of storing data coincides with a trend to store more data in databases as well as a trend to store data in larger databases. With a growth in the size of databases, the need for efficient methods and systems for locating and retrieving, or otherwise accessing, data therefrom is of increasing importance. Accordingly, what is needed are efficient methods for query processing and optimization.

Data access may use mechanisms such as table scans and index scans. Generally, an index scan is faster and more efficient than a table scan. Therefore, what is needed are methods for query processing that utilize an index scan, or similar mechanism, to provide greater efficiency, whether in terms of time or hardware resources (e.g. processing, bandwidth, etc.), to process a given query.

SUMMARY

In general, an innovative aspect of the subject matter described in this disclosure may be embodied in methods that include receiving, using one or more processors, a join query including a join operation on a first table and a second table and including a first condition and a second condition, the first condition based on a first index of the second table, the second condition based on a second index of the second table; determining, using one or more processors, a first result set by index scanning the second table using the first index as an index key; determining, using one or more processors, a second result set by index scanning the second table using the second index as the index key; determining, using the one or more processors, a third result set by applying a set operation to the first result set and the second result set; and providing, using the one or more processors, the third result set in response to the join query.

In general, another innovative aspect of the subject matter described in this disclosure may be embodied in systems that receives a join query including a join operation on a first table and a second table and including a first condition and a second condition, the first condition based on a first index of the second table, the second condition based on a second index of the second table; determines a first result set by index scanning the second table using the first index as an index key; determines a second result set by index scanning the second table using the second index as the index key; determines a third result set by applying a set operation to the first result set and the second result set; and provides the third result set in response to the join query.

According to yet other innovative aspects of the subject matter described in this disclosure, one or more systems comprising a processor; and a memory storing instructions that, when executed, cause the system to perform one of the methods described above.

Other implementations of one or more of these aspects include corresponding systems, apparatus, and computer programs, configured to perform the actions of the methods, encoded on computer storage devices. These and other implementations may each optionally include one or more of the following features.

The first condition is based on a first non-index column of the first table, the second condition is based on a second non-index column of the first table, and performing a table scan on the first table. The first condition and second condition are based on a non-index column of the first table and performing a table scan on the first table. The join operation includes an inner join, left outer join, right outer join, full outer join, and a cross join. The set operation is a union and the first condition and second condition are related by a disjunction operation. The set operation is an intersection when the first condition and second condition are related by a conjunction operation. The query is a complex query including a first disjunction and a first conjunction. The first index of the second table is dynamically created.

Determining whether the first condition and second condition are related by a conjunction or a disjunction; generating a query tree, the query tree including: a first leaf node associated with an index scan of the of the first index of the second table; a second leaf node associated with an index scan of the second index of the second table, wherein the first leaf node and second leaf node are child nodes of a third node; the third node associated with the set operation, the set operation determined based on whether the first condition and second condition are related by a conjunction or a disjunction; a fourth node associated with a table scan of the first table; a fifth node associated with a multi-index augmented nested loop, wherein the third node and the fourth node are child nodes of the fifth node; and a sixth node associated with providing results to a user; determining the query tree is the lowest cost plan to execute; and responsive to determining the query tree is the lowest cost plan to execute, determining the first result set, the second result set, and the third result set.

The query includes a third condition, and determining whether the first condition and second condition are related by a conjunction or a disjunction; determining whether the third condition is related to the first condition and the second condition by a conjunction or a disjunction; generating a query tree, the query tree including: a first leaf node associated with an index scan of the of the first index of the second table; a second leaf node associated with an index scan of the second index of the second table, wherein the first leaf node and second leaf node are child nodes of a third node; the third node associated with the set operation determined based on whether the first condition and second condition are related by a disjunction or conjunction; a fourth leaf node associated with an index scan of the third index of the second table, wherein the fourth leaf node and the third node are child nodes of a fifth node; the fifth node associated with a second set operation determined based on whether the first condition and second condition are related to the third condition by a conjunction or a disjunction; a sixth node associated with a table scan of the first table; a seventh node associated with a multi-index augmented nested loop, wherein the sixth node and the fifth node are child nodes of the seventh node; and an eighth node associated with providing results to a user; determining the query tree is the lowest cost plan to execute; and responsive to determining the query tree is the lowest cost plan to execute, determining the first result set, the second result set, and the third result set.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation, in the figures of the accompanying drawings in which like reference numerals are used to refer to similar elements.

FIG. 4 is a block diagram illustrating an example Augmented Nested Loop query scenario and query tree according to one embodiment.

FIG. 5 is a block diagram illustrating an example Nested Loop query scenario and query tree according to one embodiment.

FIG. 6 is a block diagram illustrating an example disjunctive query scenario and query tree according to existing systems.

FIG. 7 is a block diagram illustrating another example disjunctive query scenario and query tree according to existing systems.

FIG. 8 is a block diagram illustrating an example disjunctive query scenario and query tree according to one embodiment.

FIG. 9 is a block diagram illustrating an example conjunctive query scenario and query tree according to existing systems.

FIG. 10 is a block diagram illustrating an example conjunctive query scenario and query tree according to one embodiment.

FIG. 11 is a block diagram illustrating an example complex query scenario and query tree according to one embodiment.

FIG. 12 is a block diagram illustrating an example disjunctive query scenario and query tree using a dynamic index according to one embodiment.

DETAILED DESCRIPTION

Figure 1:
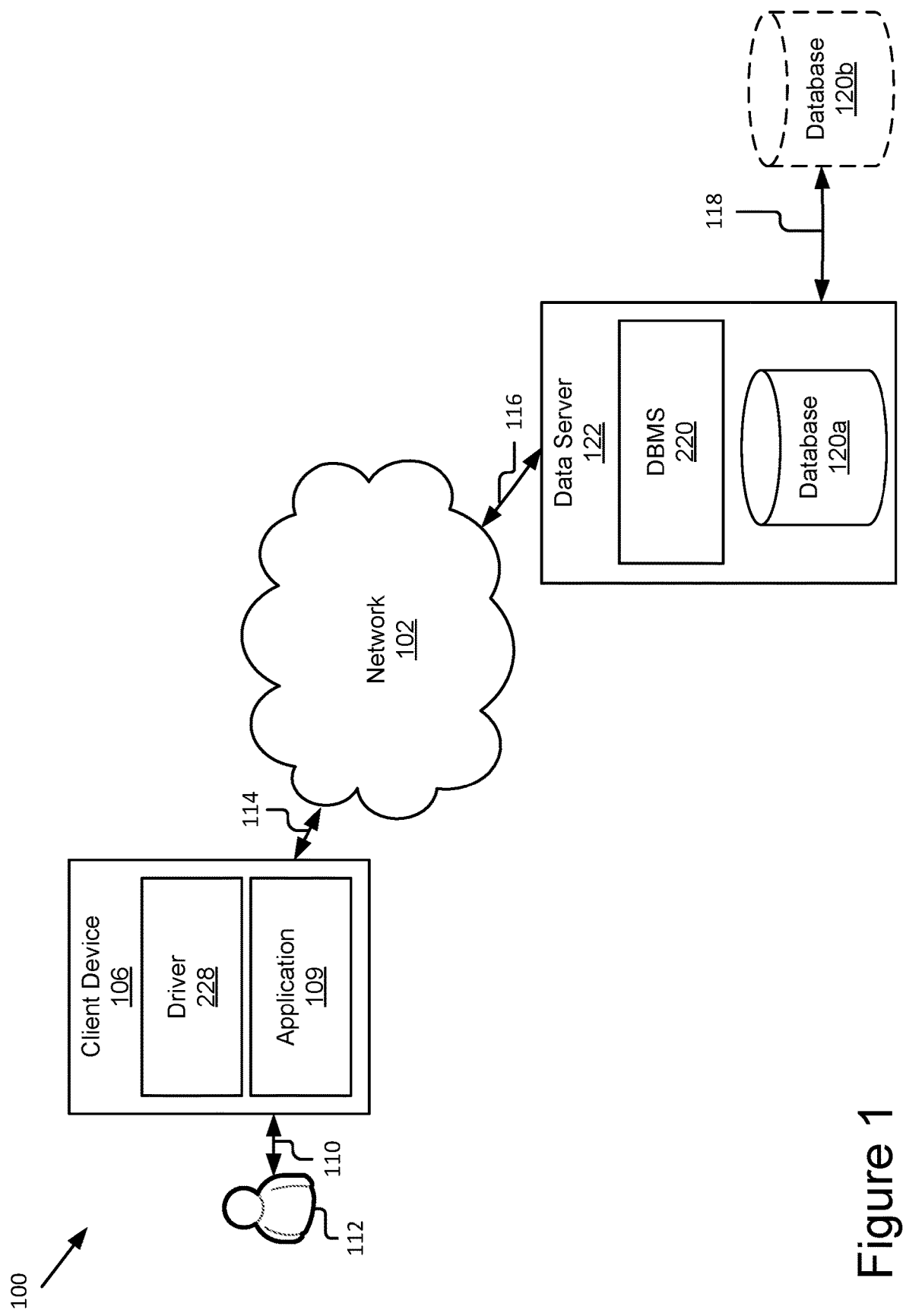
FIG. 1 is a block diagram illustrating an example query system according to one embodiment.

FIG. 1 is a block diagram illustrating an example system 100 for processing a query according to one embodiment.

The illustrated system 100 includes a client device 106 and a data server 122, which are communicatively coupled via a network 102 for interaction with one another. For example, the client devices 106 may be coupled to the network 102 via signal line 114. The data server 122 may be coupled to the network 102 via signal line 116. In some embodiments, the client device 106 may be accessed by a user 112 as illustrated by line 110. The system 100 includes one or more databases (referred to individually as database 120 and collectively as databases 120). The one or more databases may be included in the data server 122 as illustrated by database 120a, coupled to the data server 122 as a direct access storage (DAS) illustrated by database 120b and line 118, coupled to the data server 122 via the network 102 as a network accessible storage (NAS) (not shown), or a combination thereof.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation, Comma Separated Values (CSV), etc. In addition, all or some of links can be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client device 106 is a computing device having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, input devices (e.g. mouse, keyboard, camera, sensors, etc.) firmware, operating systems, drivers, various physical connection interfaces (e.g., USB, HDMI, etc.). The client devices 106 may couple to and communicate with one another and the other entities (e.g. data server 122) of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1 for clarity and convenience, the system 100 may include any number of client devices 106. In addition, the any number of client devices 106 may be the same or different types of computing devices 106. In the depicted embodiment, the client device 106 includes an instance of a driver 228 and an application 109.

The application 109 may be storable in a memory and executable by a processor of a client device 106. In one embodiment, the application 109 requests and uses data which is stored by one or more data sources 120. The application 109 may be any application written in any language. For example, the application 109 may be one of a Java, a C, a C++ and Microsoft.net application. It should be recognized that the preceding are merely examples of applications 109 and others exist.

The driver 228 may be storable in a memory and executable by a processor of a client device 106. The driver 228 may refer to a traditional driver, e.g. a JDBC driver or ODBC driver, or a client library, e.g. an HTTP client library to communicate using REST protocols. In one embodiment, the driver 228 is a standards based driver. For example, in some embodiments, the driver 228 uses one or more of the open database connectivity (ODBC), Java database connectivity (JDBC) and REST protocols. In one embodiment, the driver 228 communicates with the database management system (DBMS) 220 to expose and provide the application 109 access to data stored by one or more databases 120.

The data server 122 may include one or more computing devices having data processing, storing, and communication capabilities. For example, the data server 122 may include one or more hardware servers, server arrays, storage devices, systems, etc., and/or may be centralized or distributed/cloud-based. In some implementations, the data server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the data server 122 includes the DBMS 220 module. The DBMS 220 module may be storable in a memory and executable by a processor of a data server 122 to provide access to data stored by a database 120. For example, in one embodiment, the DBMS 220 provides an application 109 using a driver 228 access to data stored by a database 120 via the network 102.

It should be recognized that while the examples and description herein may refer to embodiments that use the Structured Query Language (SQL), which is a relational DBMS, other relational DBMS and non-relational (e.g. NoSQL) DBMS exist and the disclosure herein may be adapted and applied to a DBMS that does not use SQL. Therefore, the disclosure herein is not merely limited to SQL or the examples herein. A database 120 may be stored on one or more non-transitory computer-readable mediums for storing data.

It should be understood that the system 100 illustrated in FIG. 1 is representative of an example query system according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems may be included. For example, in one embodiment, the application 109, driver 228, the DBMS 228 and database 120 may be included in a single computing device (not shown).

Figure 2:
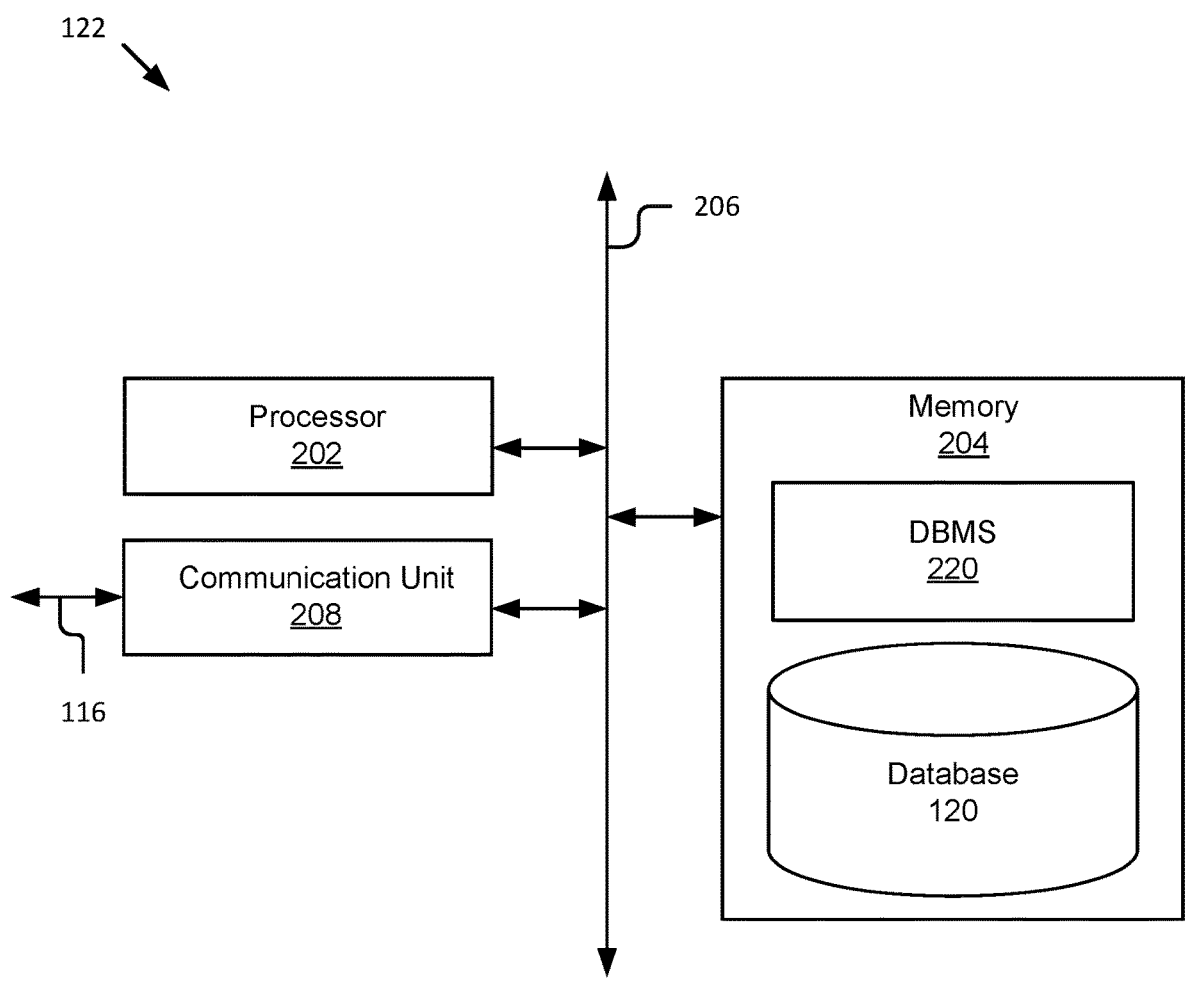
FIG. 2 is a block diagram illustrating an example data server according to one embodiment.

FIG. 2 is a block diagram of an example data server 122 according to one embodiment. The data server 122, as illustrated, may include a processor 202, a memory 204 and a communication unit 208, which may be communicatively coupled by a communications bus 206. The data server 122 depicted in FIG. 2 is provided by way of example and it should be understood that it may take other forms and include additional or fewer components without departing from the scope of the present disclosure. For example, while not shown, the data server 122 may include input and output devices (e.g., one or more of a display, a keyboard, a mouse, touch screen, speakers, microphone, camera, sensors, etc.), various operating systems, sensors, additional processors, and other physical configurations.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be coupled to the memory 204 via the bus 206 to access data and instructions therefrom and store data therein. The bus 206 may couple the processor 202 to the other components of the data server 122 including, for example, the memory 204 and communication unit 208.

The memory 204 may store and provide access to data to the other components of the data server 122. In some implementations, the memory 204 may store instructions and/or data that may be executed by the processor 202. For example, in the illustrated embodiment, the memory 204 may store the DBMS 220 module. The memory 204 is also capable of storing other instructions and data, including, for example, an operating system, hardware drivers, other software applications, databases, etc. The memory 204 may be coupled to the bus 206 for communication with the processor 202 and the other components of the data server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive (HDD), an optical disk drive (CD, DVD, Blu-ray™, etc.). It should be understood that the memory 204 may be a single device or may include multiple types of devices and configurations. For example, in one embodiment, the database 120 may be stored on a HDD and portions may be read into RAM for processing by the processor 202. In one embodiment, the memory 204 includes the DBMS 220 and a database 120.

The bus 206 can include a communication bus for transferring data between components of a data server 122 and/or between computing devices (e.g. between the data server 122 and the client device 106), a network bus system including the network 102 or portions thereof, a processor mesh, a combination thereof, etc. In some implementations, the DBMS 220, its sub-components and various other software operating on the data server 122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

Example Database Management System (DBMS) 220 Module

Figure 3:
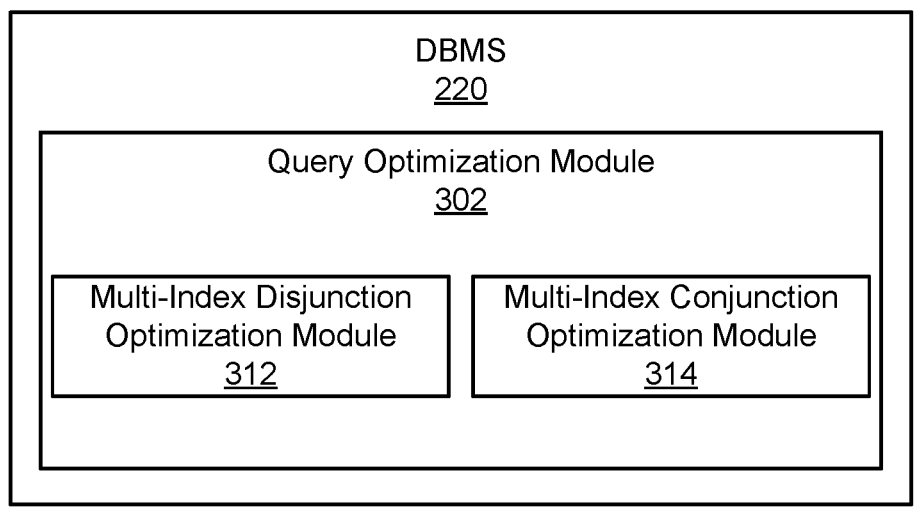
FIG. 3 is block diagram illustrating an example database management system according to one embodiment.

Referring now to FIG. 3, the DBMS 220 module is shown in more detail according to one embodiment. FIG. 3 is a block diagram of the DBMS 220 module included in a data server 122 according to one embodiment.

The DBMS 220 provides access to data stored by a database 120. For example, in one embodiment, the DBMS 220 provides an application 109 using a driver 228 access to data stored by a database 120 via the network 102. In one embodiment, the DBMS 220 receives a query requesting access to and/or manipulation of data, parses the query (e.g. to determine permissions, semantics, syntax, etc.), generates and selects a query plan for accessing and/or manipulating the data as requested, and executes the plan to access and/or manipulate the requested data.

As the number of databases, the size of databases and the number of queries made on a database increase, the efficiency of query processing and, therefore, the optimization of the query plan becomes increasingly important. The present disclosure provides a DBMS 220 for processing join queries using multiple indexes in the join operation(s), which may provide more efficient processing than current DBMS systems, for example, by reducing the number of rows read when executing the query.

In the illustrated embodiment, the DBMS 220 includes a multi-index disjunction optimization module 312 and a multi-index conjunction optimization module 314. However, it should be recognized that, according to some embodiments, one of the multi-index disjunction optimization module 312 and its features and functionality and the multi-index conjunction optimization module 314 and its features and functionality may be omitted from the DBMS 220. It should also be recognized that the modules 312 and 314, comprised in the DBMS 220 module may not be separate modules. For example, while 312 is described with regard to disjunctive operators and 314 is described with regard to conjunctive operators for clarity and convenience herein, the functionality need not be divided into the separate modules 312 and 314. It should further be recognized that the modules 312 and 314, comprised in the DBMS 220 module may not necessarily all reside on the same data server 122. In one embodiment, the modules 312, 314 and/or their functionality are distributed across multiple data servers 122.

The multi-index disjunction optimization module 312 includes code and routines for generating and selecting a query plan using multiple indexes for a join query that includes a disjunction operator. In one embodiment, the multi-index disjunction optimization module 312 is a set of instructions executable by the processor 202. In another embodiment, the multi-index disjunction optimization module 312 is stored in the memory 204 and is accessible and executable by the processor 202. In either embodiment, the multi-index disjunction optimization module 312 is adapted for cooperation and communication with the processor 202, other components of the data server 122 and other components of the DBMS 220 module.

The multi-index disjunction optimization module 312 includes code and routines for generating and selecting a query plan (e.g. a query tree) using multiple indexes for a join query that includes a disjunction operator. In one embodiment, the multi-index disjunction optimization module 312 determines a received query is a join query including a join operation on two tables. Examples of join operations include, but are not limited to an inner join, left outer join, right outer join, full outer join, or a cross join. For example, the multi-index disjunction optimization module 312 determines a received query includes an inner join on a first table (e.g. Tab1) and a second table (e.g. Tab2).

In one embodiment, the multi-index disjunction optimization module 312 determines that the join operation further includes two or more conditions. For example, the multi-index disjunction optimization module 312 determines the join query includes a first condition (e.g. Tab1.Col1=Tab2.Fld1) and a second condition (e.g. Tab1.Col2=Tab2.Fld2).

In one embodiment, the multi-index disjunction optimization module 312 determines that two conditions are based on two or more columns that are indexed. For example, the multi-index disjunction optimization module 312 determines that Fld1 and Fld2 are columns of table Tab2 which has indexes defined on them. In some embodiments, the multi-index disjunction optimization module 312 determines that a participating column of Table Tab2 does not have an index defined on it and dynamically indexes the participating column. While a typical index is created by a user and persist unless or until a user explicitly removes the index, a dynamic index is a temporary index created during execution of the query optimization module 302 and destroyed after execution of the query.

In one embodiment, the multi-index disjunction optimization module 312 determines that the two conditions are related by a disjunction operation. For example, the multi-index disjunction optimization module 312 determines that the first condition (e.g. Tab1.Col1=Tab2.Fld1) and a second condition (e.g. Tab1.Col2=Tab2.Fld2) are related by an "OR".

The multi-index disjunction optimization module 312 generates a query tree by adding nodes including a first leaf node for an index scan on an index that is a basis for the first condition (e.g. used to evaluate a part of the first condition), a second leaf node for an index scan on an index that is the basis for the second condition (e.g. used to evaluate a part of the second condition), a third leaf node for a scan operation, an intermediary node associated with a Tuple Identifier (TID) Union operation using the aforementioned index scans, an intermediary node associated with an Multi Index Augmented Nested Loop (MIANL) join that evaluates the first and second conditions using the TID union. For example, the multi-index disjunction optimization module 312 generates a query tree by adding nodes including a first leaf node for an index scan on Tab2 using Fld1 of Tab2 as the index key, where Tab2.Fld1 is a basis for evaluating the first condition of Tab1.Col1=Tab2.Fld1, a second leaf node for an index scan on index scan on Tab2 using Fld2 of Tab2 as the index key, where Tab2.Fld2 is a basis for evaluating the second condition of Tab1.Col2=Tab2.Fld2, a third leaf node for a table scan operation of TAB1, an intermediary node associated with a Tuple Identifier (TID) Union operation (i.e. one kind of set operation) using the aforementioned index scans, an intermediary node associated with an Multi-Index Augmented Nested Loop (MIANL) join that evaluates the first and second conditions (i.e. Tab1.Col1=Tab2.Fld1, Tab1.Col2=Tab2.Fld2 in this example) using the TID union. In one embodiment, a TID Union is an operation that evaluates tuple (row) identifiers which are returned by aforementioned index scans and discards duplicates (i.e. rows having Tuple IDs that meet both the first and second conditions). To summarize and simplify, in one embodiment, for the example tables and indexes discussed in this paragraph, the multi-index disjunction optimization module 312 generates a query tree similar to the query tree 800 of FIG. 8.

In one embodiment, the multi-index disjunction optimization module 312 determines the query tree (e.g. query tree 800) is the plan with the lowest cost (e.g. vs query tree 600 and 800), and that query plan (e.g. 800) is selected for execution and is executed. The features, functionality, and benefits of the multi-index disjunction optimization module 312 are discussed in detail below with reference to FIG. 8 and the query tree 800 therein.

The multi-index conjunction optimization module 314 includes code and routines for generating and selecting a query plan using multiple indexes for a join query that includes a conjunction operator. In one embodiment, the multi-index conjunction optimization module 314 is a set of instructions executable by the processor 202. In another embodiment, the multi-index conjunction optimization module 314 is stored in the memory 204 and is accessible and executable by the processor 202. In either embodiment, the multi-index conjunction optimization module 314 is adapted for cooperation and communication with the processor 202, other components of the data server 122 and other components of the DBMS 220 module.

The multi-index conjunction optimization module 314 includes code and routines for generating and selecting a query plan (e.g. a query tree) using multiple indexes for a join query that includes a conjunction operator. In one embodiment, the multi-index conjunction optimization module 314 determines a received query is a join query including a join operation on two tables. Examples of join operations include, but are not limited to an inner join, left outer join, right outer join, full outer join, or a cross join. For example, the multi-index conjunction optimization module 314 determines a received query includes an inner join on a first table (e.g. Tab1) and a second table (e.g. Tab2).

In one embodiment, the multi-index conjunction optimization module 314 determines that the join operation further includes two or more conditions. For example, the multi-index conjunction optimization module 314 determines the join query includes a first condition (e.g. Tab1.Col1=Tab2.Fld1) and a second condition (e.g. Tab1.Col2=Tab2.Fld2).

In one embodiment, multi-index conjunction optimization module 314 determines that two conditions are based on two or more columns that are indexed. For example, multi-index conjunction optimization module 314 determines that Fld1 and Fld 2 are columns of Tab2 which has indexes defined on them. In some embodiments, the multi-index conjunction optimization module 314 determines that a participating column of Table Tab2 does not have an index defined on it and dynamically indexes the participating column.

In one embodiment, the multi-index conjunction optimization module 314 determines that the two conditions are related by a conjunction operation. For example, the multi-index conjunction optimization module 314 determines that the first condition (e.g. Tab1.Col1=Tab2.Fld1) and a second condition (e.g. Tab1.Col2=Tab2.Fld2) are related by an "AND".

The multi-index conjunction optimization module 314 generates a query tree by adding nodes including a first leaf node for an index scan on an index that is a basis for the first condition (e.g. used to evaluate a part of the first condition), a second leaf node for an index scan on an index that is the basis for the second condition (e.g. used to evaluate a part of the second condition), a third leaf node for a scan operation, an intermediary node associated with a Tuple Identifier (TID) Intersection operation using the aforementioned index scans, an intermediary node associated with an Multi-Index Augmented Nested Loop (MIANL) join that evaluates the first and second conditions using the TID Intersection. For example, the multi-index conjunction optimization module 314 generates a query tree by adding nodes including a first leaf node for an index scan on Tab2 using Fld1 of Tab2 as the index key, where Tab2.Fld1 is a basis for evaluating the first condition of Tab1.Col1=Tab2.Fld1, a second leaf node for an index scan on index scan on Tab2 using Fld2 of Tab2 as the index key, where Tab2.Fld2 is a basis for evaluating the second condition of Tab1.Col2=Tab2.Fld2, a third leaf node for a table scan operation of Tab1, an intermediary node associated with a Tuple Identifier (TID) Intersection operation using the aforementioned index scans, an intermediary node associated with an MIANL join that evaluates the first and second conditions (i.e. Tab1.Col1=Tab2.Fld1, Tab1.Col2=Tab2.Fld2 in this example) using the TID Intersection. In one embodiment, a TID Intersection is an operation that evaluates tuple (row) identifiers which are returned by aforementioned index scans and discards duplicates (i.e. rows having Tuple IDs that meet both the first and second conditions). To summarize and simplify, in one embodiment, for the example tables and indexes discussed in this paragraph, the multi-index conjunction optimization module 314 generates a query tree similar to the query tree 1000 of FIG. 10.

In one embodiment, the multi-index conjunction optimization module 314 determines the query tree is the plan with the lowest cost (e.g. vs query tree 900), and that query plan (e.g. 1000) is selected for execution and executed. The features, functionality, and benefits of the multi-index conjunction optimization module 314 are discussed in detail below with reference to FIG. 10 and the query tree 1000 therein.

Databases perform Joins when a query contains multiple tables. There are multiple types of join methods to process joins, but two of the widely used join methods are "Nested Loop" and "Augmented Nested Loop." Since different databases refer to these join methods using different names, they are explained below with reference to the example scenarios of FIGS. 4 & 5.

Referring now to FIG. 4, FIG. 4 illustrates an example Augmented Nested Loop query scenario, also referred to as Query Scenario 1 herein, according to one embodiment. As indicated at 402, there are two tables-Tab1 and Tab2. Tab1 has three columns-Col1, Col2, and Col3. Col1, Col2, and Col3 columns that all have an integer data type. Tab2 has three columns-Fld1, Fld2, and Fld3. Fld1, Fld2, and Fld3 columns that all have an integer data type. As indicated at 404, Tab1 does not have an index, while Tab2 has multiple indexes-created on Fld1, an index created on Fld2 and a composite index created on (Fld2, Fld3). As indicated at 406, a join query—an inner join in the example shown—is received. As mentioned above, a join is used when a query includes or involves more than one table. In the illustrated Query Scenario 1, the query received, as indicated at 406, includes Tab1 and Tab2 in order to obtain the result of where Col1 of Tab1 and Fld1 of Tab2 are the same (i.e. Tab1.Col1=Tab2.Fld1). Since Fld1 of Tab2 has an index, this index may be used to evaluate the join condition, this join method is referred to as an "Augmented Nested Loop" (ANL).

Referring now to FIG. 5, FIG. 5 illustrates an example Nested Loop query scenario, also referred to as Query Scenario 2 herein, according to one embodiment. As indicated at 502, there are two tables-Tab1 and Tab2. Tab1 has three columns—Col1, Col2, and Col3. Col1, Col2, and Col3 columns that all have an integer data type. Tab2 has three columns—Fld1, Fld2, and Fld3. Fld1, Fld2, and Fld3 columns that all have an integer data type. As indicated at 504, Tab1 does not have an index, while Tab2 has multiple indexes—created on Fld1, an index created on Fld2 and a composite index created on (Fld2, Fld3). As indicated at 506, a join query—an inner join in the example shown—is received. As mentioned above, a join is used when a query includes or involves more than one table. In the illustrated Query Scenario 2, the query received, as indicated at 506, includes Tab1 and Tab2 in order to obtain the result of where Col3 of Tab1 and Fld3 of Tab2 are the same (i.e. Tab1.Col3=Tab2.Fld3). Since neither Col3 of Tab1 nor Fld3 of Tab2 has an index, hence no index is used to evaluate the join condition. This join method is referred to as "Nested Loop" (NL).

The NL is computationally more costly compared to an ANL, because a NL uses the Cartesian product of two tables before evaluating the join condition, whereas an ANL uses an index to evaluate the join condition. Additionally, an index scan is generally faster and less computationally costly than a table scan. Therefore, the query plan 408 using the Augmented Nested Loop, as depicted in block diagram 400 of FIG. 4, would execute more quickly than the query plan 508 using the Nested Loop, as depicted in block diagram 500 of FIG. 5, if everything else remained equal (e.g. number of rows returned in the result) due to the use of ANL vs NL (422 vs 524 & 522) and usage of the index scan instead of using table scan (426 vs 528). A Multi-Index Augmented Loop differs from an Augmented Nested Loop in that it utilizes multiple indices and one or more SET operations.

Join conditions, depending on the query, may include a logical disjunction operator (e.g. OR), a logical conjunction operator (e.g. AND), or a combination thereof. Existing systems evaluate a logical disjunction (OR) operator using two methods discussed with reference to FIGS. 6 &7. For clarity and convenience, examples of two, existing methods of handling a join operation including a disjunction operator are described, with reference to FIGS. 6 and 7, and compared to the operation of the multi-index disjunction optimization module 312, with reference to FIG. 8, disclosed herein.

Existing systems evaluate a logical conjunction (AND) operator using a method discussed with reference to FIG. 9. For clarity and convenience, an example of an existing method of handling a join operation including a conjunction operator is described, with reference to FIG. 9, and compared to the operation of the multi-index conjunction optimization module 314, with reference to FIG. 10, disclosed herein. Additionally, the handling of a complex join operation (i.e., includes multiple conjunctions, multiple disjunctions or a mixture of one or more conjunctions and one or more disjunctions) is described with reference to FIG. 11.

Example and Discussion of Disjunction Use Cases

As previously mentioned, there may be many query scenarios where a logical disjunction operator (e.g. OR) is used in a join condition that involves columns which have indexes on them. To better understand the operation and benefits of the multi-index disjunction optimization module 312, it may be useful to discuss existing methods for processing a join condition with a disjunction operator. Referring now to FIG. 6, an example query scenario 3 is described. In example query scenario 3, the following query 606 is received:

QUERY 606: SELECT Tab1.Col1, Tab2.Fld2
FROM Tab1 INNER JOIN Tab2 ON Tab1.Col1 = Tab2.Fld1
OR Tab1.Col2= Tab2.Fld2;

For the purpose of discussion, let us assume that the query returns 100 rows. Existing systems may create the query plan 600, which uses a Nested Loop join 624. In a Nested Loop join method, indexes are not used for evaluation of join conditions. Therefore, for each left side row, existing systems read all rows from right side to see if any of the condition is satisfied. Therefore, when a disjunction operator (OR) is involved in the join condition, a query plan using a Nested Loop join is created and executed, which is a costly operation.

More specifically, while there are indexes on Tab2.Fld1 and Tab2.Fld2 columns, existing optimizers cannot use these to evaluate the join condition. Hence, Nested Loop (NL) join method will be used which does table scan on Tab2 to read all rows of Tab2 for each row of Tab1 and evaluate the join condition. Now, assume that table Tab1 has 1000 rows and Tab2 has 100,000 rows, then, for each left side row, 100,000 rows of right-side table will be read. Since, there are 1,000 rows in left-side table, this would result in 100,000,000 rows on which the specified join condition will be applied before returning the result of 100 rows.

Some existing systems have attempted to improve on the processing of queries including a join and a disjunction operator (e.g. query 606). Referring now to FIG. 7, query scenario 4 is described. In query scenario 4, query 706

(identical to query 606 of the previous scenario) is received. However, the existing query optimizer, realizing there are indexes available on columns involved in the disjunction condition, uses a Union operation. The Union operation splits query 706 into two logical queries, 708a and 708b, and performs union of the same. Each logical query 708a and 708b may use the available index. Since, columns, Tab2.Fld1 and Tab2.Fld2 have indexes defined on them, so the original query 706 can be re-written as query 708 below.

---
QUERY 708: SELECT Tab1.Col1, Tab2.Fld2, Tab2.ROWID
    FROM Tab1 INNER JOIN Tab2 ON Tab1.Col1 = Tab2.Fld1
    UNION
    SELECT Col1, Fld2, Tab2.ROWID
    FROM Tab1 INNER JOIN Tab2 ON Tab1.Col2 = Tab2.Fld2;
---

Although, the method of FIG. 7 is better than the Nested Loop method of FIG. 6 in that it makes use of Indexes, it still has the following de-merits. First, it performs two join operations. Second, since it does two join operations, it must read left-side table of the join operation twice. See Table Scans of Tab1 at 728 and 732 in of the query tree 700. Third, when there are other join conditions apart from the disjunction condition (not shown in this example), then this approach reads the same rows of right-side table redundantly to evaluate the extra condition. We can visualize the specified condition as (Tab1.Col1=Tab2.Fld1 OR Tab1.Col2=Tab2.Fld2) AND (Tab1.Col3=Tab2.Fld3). Where the extra condition is Tab1.Col3=Tab2.Fld3.

Referring now to FIG. 8, the multi-index disjunction optimization module 312 provides a join strategy that uses multiple indexes to evaluate a given join condition with a disjunction operator. With the introduction of the multi-index disjunction optimization module 312 and the join method, described further by way of example with reference to FIG. 8, a query optimizer (not shown) of the DBMS 220 has an option to pick and execute a join method which utilizes more than one index, which was not previously feasible.

Consider query scenario 5, in which query 806 is received (identical to queries 606 and 706).

---
QUERY 806: SELECT Col1, Fld2
    FROM Tab1 INNER JOIN Tab2 ON Tab1.Col1 = Tab2.Fld1
    OR Tab1.Col2 = Tab2.Fld2;
---

In the schema defined at 802 and 804 of query scenario 5 (also in 602 and 604 of query scenario 3 and 702 and 704 of query scenario 4), there are two different indexes on Tab2.Fld1 and Tab2.Fld2 columns. Now, since there are two different indexes on columns, Tab2.Fld1 and Tab2.Fld2, multi-index disjunction optimization module 312 creates a TID-UNION operator on right side of the join operator. The TID-UNION operator contains two children, one doing an index scan for column Tab2.Fld1 to evaluate first part of the condition, Tab1.Col1=Tab2.Fld1, and another doing an index scan on column, Tab2.Fld2 to evaluate second part of the join condition, Tab1.Col2=Tab2.Fld2. Now, both these index scans return Tuple ID (Row ID) of the rows which matches corresponding conditions. The TID-UNION operator does UNION of these Tuple IDs to remove duplicate Tuple IDs or Tuple IDs which are common in both results of underlying index scans. FIG. 8 illustrates an example embodiment of a query tree 800 generated by the multi-index disjunction optimization module 312 as described above.

Assume that, Tab1 and Tab2 contains rows as mentioned below:
  Tab1 (Col1, Col2, Col3)
    TAB1-TID1: (10, 20, 30)
    TAB1-TID2: (100, 20, 30)
  Tab2 (Fld1, Fld2, Fld3)
    TAB2-TID1: (10, 40, 30)
    TAB2-TID2: (10, 20, 30)
    TAB2-TID3: (50, 60, 70)
    TAB2-TID4: (50, 20, 30)

The join condition, Tab1.Col1=Tab2.Fld1 OR Tab1.Col2=Tab2.Fld2, should output the below rows.
  RESULT-ROW1: (10,20,30, 10,40,30)
  RESULT-ROW2: (10,20,30, 10,20,30)
  RESULT-ROW3: (10,20,30, 50,20,30)
  RESULT-ROW4: (100,20,30, 10,20,30)
  RESULT-ROW5: (100,20,30, 50,20,30)

The above output is obtained using the multi-index disjunction optimization module 312 and the query tree 800 as follows. For TAB1-TID1 row of Tab1, when index scan on Tab2.Fld1 takes place, it will results in two rows of Tab2 which are TAB2-TID1 and TAB2-TID2. Similarly, when index scan on Tab2.Fld2, happens for TAB1-TID1, it results in two rows, which are TAB2-TID2 and TAB2-TID4. So, for TAB1-TID1, the Tuple IDs which are produced by index scan of Tab2.Fld1 will be (TAB2-TID1, TAB2-TID2). The Tuple IDs which are produced by index scan of Tab2.Fld2 will be (TAB2-TID2, TAB2-TID4).

Next, TID-UNION operator executes performing a UNION operation on these two results to arrive at below result set for TAB1-TID1 row of Tab1.
(TAB2-TID1, TAB2-TID2, TAB2-TID4)

The index scan on Tab2Fld1 will result in no rows and index scan on Tab2.Fld2 will result in 2 rows (i.e. TAB2-TID2 and TAB2-TID4). So, the result set for the second row TAB1-TID2 of Tab 1 would be union of "Empty set" with (TAB2-TID2, TAB2-TID4) which is (TAB2-TID2, TAB2-TID4).

When the results for the two rows of Tab1 are combined, then the result set would be equal to expected result. That is, Output:
  RESULT-ROW1: (10,20,30, 10,40,30)
  RESULT-ROW2: (10,20,30, 10,20,30)
  RESULT-ROW3: (10,20,30, 50,20,30)
  RESULT-ROW4: (100,20,30, 10,20,30)
  RESULT-ROW5: (100,20,30, 50,20,30)

As discussed above, if we assume that table Tab1 has 1,000 rows and Tab2 has 100,000 rows, then, when query tree 600 of FIG. 6 is executed, for each left side row, 100,000 rows of right-side table will be read. Since, there are 1,000 rows in left-side table, this would result in 100,000,000 rows on which the specified join condition is applied before returning the result of 100 rows. By contrast, if we again assume that table Tab1 has 1000 rows and Tab2 has 100,000 rows, then, when query tree 700 of FIG. 7 is executed, the number of physical reads drops from 100,000,000 to approximately 200,800. However, if we again assume that table Tab1 has 1000 rows and Tab2 has 100,000 rows, then, when query tree 800 of FIG. 8 is executed, the number of physical reads drops from to approximately 100,400, thereby improving the operation of one or more of the database and hardware associated therewith, and decreasing the time needed to provide a result.

Example and Discussion of Conjunction Use Case

There may be many query scenarios where a logical conjunction operator (AND) is used in a join condition that involves columns which have indexes on them. To better understand the operation and benefits of the multi-index conjunction optimization module 314, it may be useful to discuss existing methods for processing a join condition with a conjunction operator. Referring now to FIG. 9, an example query scenario 6 is described. In example query scenario 6, the following query 906 is received:

---
QUERY 906: SELECT Tab1.Col1, Tab2.Fld2
         FROM  Tab1 INNER JOIN Tab2 ON   Tab1.Col1 = Tab2.Fld1
                                     AND Tab1.Col2 = Tab2.Fld2;
---

For the purposes of discussion, assume the above query produces 10 rows. Though, there are two separate indexes on columns, Tab2.Fld1 and Tab2.Fld2, existing systems use only one of the indexes. Assume that, index on Tab2.Fld2 is selected, then the other part of the condition, i.e., Tab1.col1=Tab2.Fld1, is evaluated after the join processing. See query tree 900 of FIG. 9.

If we assume that tables Tab1 and Tab2 have 10,000 rows each, and assume that, irrespective of which index is selected among indexes on columns, Tab2.Fld1 or Tab2.Fld2, on an average they result in 100 rows from right-side table for each left side row, then the ANL join 924 produces 1,000,000 rows. Second condition will be applied 922 on these 1,000,000 rows to produce the result of 10 rows at 920. Therefore, such an approach reads 1,000,000 rows though the result consists of just 10 rows.

Historically, query optimizers are limited to selecting a single index for use in evaluation of a join condition. However, the multi-index conjunction optimization module 314 is able to use multiple indexes to evaluate the join condition in a more efficient manner.

Referring now to FIG. 10, query 1006 is received (which is identical to query 906 of FIG. 9).

---
QUERY 1006: SELECT Tab1.Col1, Tab2.Fld2
          FROM  Tab1 INNER JOIN Tab2 ON   Tab1.Col1 = Tab2.Fld1
                                      AND Tab1.Col2 = Tab2.Fld2;
---

Note that there are two different indexes available on columns Tab2.Fld1 and Tab2.Fld2, multi-index conjunction optimization module 314 uses "Multi-Index Augmented Nested Loop" join method which creates a TID-INTERSECTION 1026 operator on the right side of the join operator 1022 in the query tree 1000. In the query tree 1000, the TID-INTERSECTION 1026 operator contains two children, one 1028 doing an index scan for column Tab2.Fld1 to evaluate part of the join condition, Tab1.Col1=Tab2.Fld1, and another 1030 doing an index scan on column, Tab2.Fld2 to evaluate second part of the join condition, Tab1.Col2=Tab2.Fld2. Both these index scans 1028 & 1030 return Tuple IDs (RowID) of the rows which matches corresponding conditions. TID-INTERSECTION operator does INTERSECTION of these Tuple IDs to make sure that tuples which match both the conditions are obtained. Rows with these Tuple IDs are then read for the further processing.

This means the join method only reads 100 rows which satisfy complete join condition, contrast to existing methods which reads a greater number of rows. For example, as discussed above, if we assume that tables Tab1 and tab 2 each have 10,000 rows, then, when query tree 900 of FIG. 9 is executed, for each left side row, 100 rows of right-side table will be read. Since, there are 10,000 rows in left-side table, this would result in 1,000,000 rows on which the specified join condition is applied before returning the result of 10 rows. By contrast, if we again assume that tables Tab1 and tab 2 each have 10,000 rows, then, when query tree 1000 of FIG. 10 is executed, the number of physical reads drops from 1,000,000 to approximately 100 rows which satisfy the join condition, thereby improving the operation of one or more of the database and hardware associated therewith, and decreasing the time needed to provide a result.

Example and Discussion of Complex Join Condition Use Case

In the preceding portions of the description, for clarity and convenience, the query optimization module 302 and its subcomponents 312 & 314 have been discussed with regard to simple join conditions including a single disjunction or single conjunction operation. However, it should be recognized that Multi-Index Augmented Nested Loop method discussed above with reference to FIGS. 1-3, 8 and 10 is not limited to such simple join queries. Rather, it should be recognized that the systems and methods herein may be used for complex" queries having multiple disjunctions or multiple conjunctions or combination of both. For clarity and convenience, please consider Query scenario 8 (1102) and FIG. 11, which includes:

---
QUERY 1106:   SELECT Col1, Fld2
            FROM Tab1 INNER JOIN Tab2 ON
                 (Tab1.Col1 = Tab2.Fld2 AND Tab1.Col2 = Tab2.Fld3)
                                       OR
                 (Tab1.Col2 = Tab2.Fld1 AND Tab1.Col3 = Tab2.Fld2);
---

Note that, above join condition has combination of a disjunction and two conjunctions. FIG. 11 shows a query tree 1100 generated by the query optimizer 302 and the subcomponents thereof 312 and 314. The multi-index disjunction optimization module 312 and the multi-index conjunction optimization module 314 cooperate to generate the query tree 1100. The nodes and relative positions in the query tree 1100 are determined based on the join operation and junction (e.g. conjunction or disjunction) operations therein. In the illustrated embodiment of FIG. 11, the multi-index conjunction optimization module 314 adds a node for an index scan of Tab2 using Fld1 as the index key 1132 and a node for an index scan of Tab2 using Fld2 as the index key 1134 based on the conditions Tab1.Col2=Tab2.Fld1 and Tab1.Col3=Tab2.Fld2, respectively. The multi-index conjunction optimization module 314 adds a node 1130 for the set operation (TID-Intersection, as shown, because Tab1.Col2=Tab2.Fld1 and Tab1.Col3=Tab2.Fld2 are related by an "AND" in Query 1106). The multi-index disjunction optimization module 312 adds a node 1126 for the set operation (TID-Union, as shown, because of the "OR" in Query 1106), where the TID-Intersection node 1130 and Index scan node 1128 of Tab2 using Fld2 and Fld3 as index keys are child nodes of the TID-Union node 1126. The query optimization node 302 adds a Multi-Index Augmented Nested Loop node 1122 to the query tree 1100, where the TID-Union node 1126 and the Table scan node 1124 are child nodes of the Multi-Index Augmented Nested Loop join node 1122. The query optimization node 302 adds a node 1120 to the query tree 1100 for providing the results of the query.

Example and Discussion of Dynamic Index Use Cases

Referring now to FIG. 12, a query scenario is described in which an index was not created on a participating column (i.e. Fld2 of Tab2) in the query 1206. However, the multi-index disjunction optimization module 312 dynamically indexes 1230 Fld 2 of Tab2 and thereafter operates similar to query scenario 5 of FIG. 8.

While creation of the dynamic index does come at a computational price, in most practical applications that tables involved exceed the threshold at which the cost of creating the dynamic index, or indices, is less than the cost of having a Nested Loop and reverting to tables scanning.

It should be recognized that creation of a dynamic index is not limited to disjunctive use cases. While query scenario 9 of FIG. 12 is disjunctive, it was merely selected for illustration purposes. A dynamic index may be created and used in conjunctive, or mixed/complex use cases; however, for clarity and simplicity, only the disjunctive use case is illustrated and discussed in detail herein with reference to FIG. 12.

It should be recognized that, while the examples discussed herein focus on queries that include two or three conditions, the Multi-Index Augmented Nested Loop method discussed herein may accommodate any number of conditions and is not limited to a maximum of 2 or 3 conditions. For example, based on the description herein it should be recognized how the Multi-Index Augmented Nested Loop method discussed herein would handle a query such as:

```
SELECT Col1, Fld2
    FROM Tab1 INNER JOIN Tab2 ON
        (Tab1.Col1 = Tab2.Fld1 OR Tab1.Col2 = Tab2.Fld2 OR
        Tab1.Col3 = Tab2.Fld3);
```

Or the query:

```
SELECT Col1, Fld2
    FROM Tab1 INNER JOIN Tab2 ON
        (Tab1.Col1 = Tab2.Fld1 AND Tab1.Col2 = Tab2.Fld2 AND
        Tab1.Col3 = Tab2.Fld3);
```

Or the query:

```
SELECT Col1, Fld2
    FROM Tab1 INNER JOIN Tab2 ON
        (Tab1.Col1 = Tab2.Fld2 OR Tab1.Col2 = Tab2.Fld2)
            AND
        (Tab1.Col3 = Tab2.Fld3 OR Tab1.Col4 = Tab2.Fld4)
            OR
        (Tab1.Col4 = Tab2.Fld4 AND Tab1.Col5 = Tab2.Fld5);
```

Or queries with a greater number of conditions.

It should further be recognized that certain operations may occur in parallel. For example, while the description herein may refer to determining a first result set by index scanning a table using the first index as an index key and a second result set by index scanning the table using the second index as the index key, the result sets may be determined in parallel and the terms such as "first" and "second" may be used to differentiate between various instances (e.g. result sets or indices) and may not necessarily describe the order in which the results, tables, or indices are processed or received.

Example Methods

Figure 13:
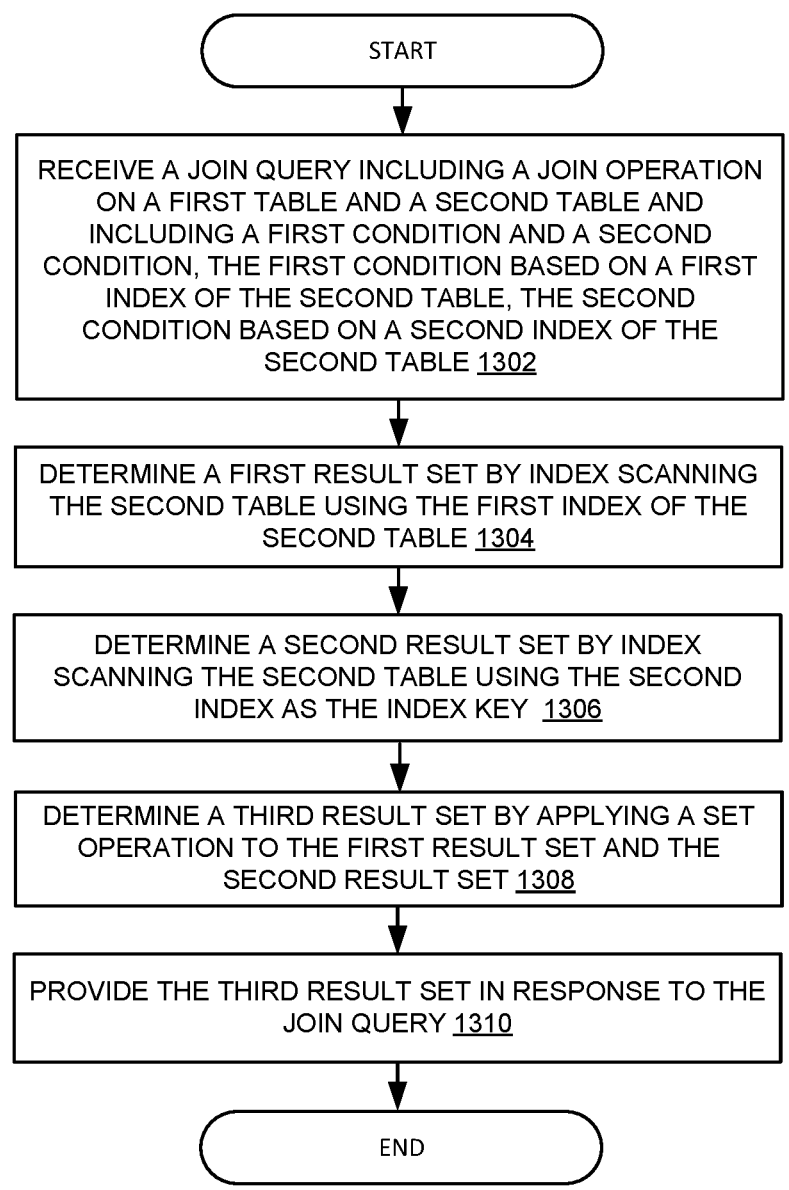
FIG. 13 is flowchart of an example method for multi-index join processing according to one embodiment.
Figure 14:
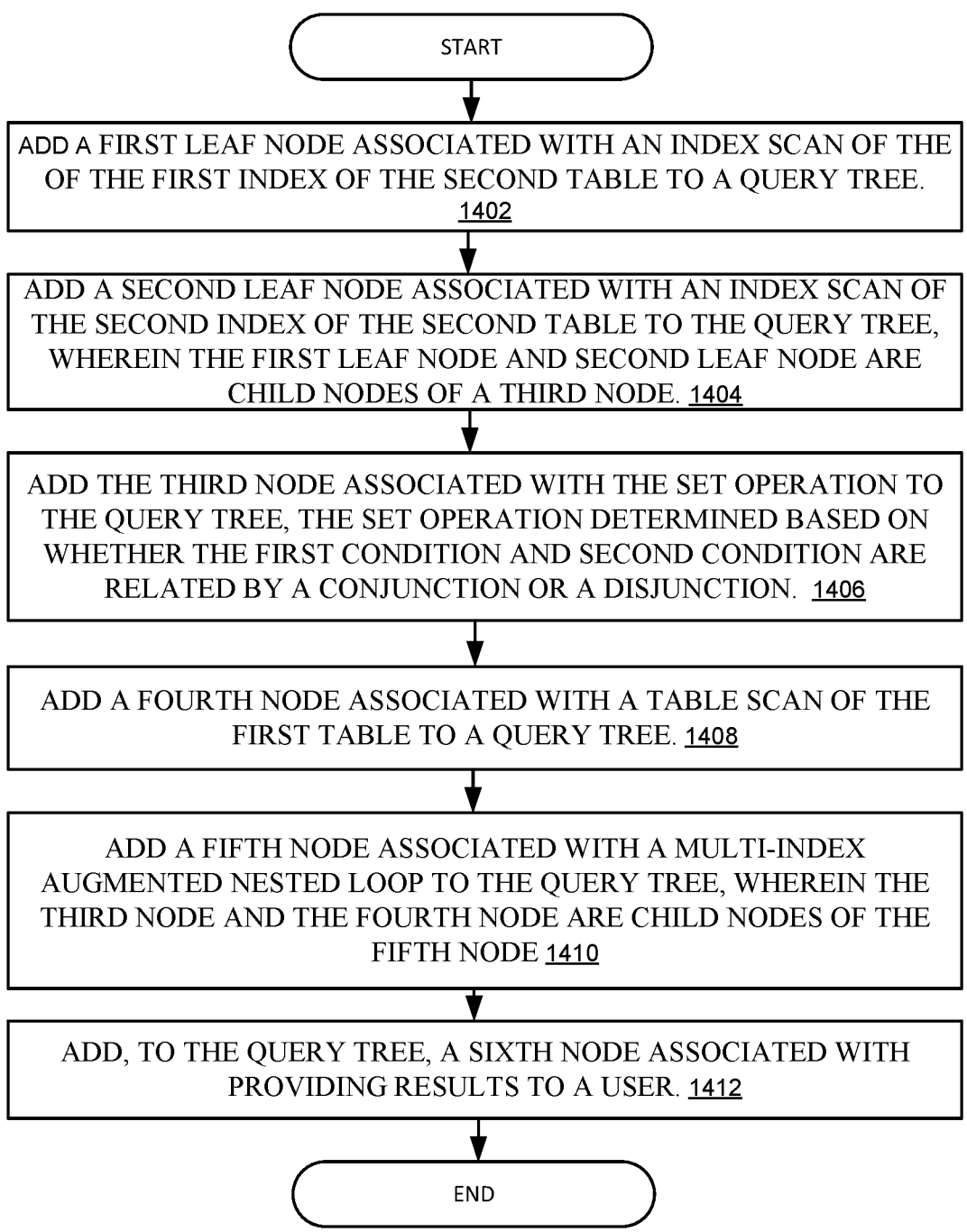
FIG. 14 is flowchart of an example method of creating a query tree for multi-index join according to one embodiment.
Figure 15:
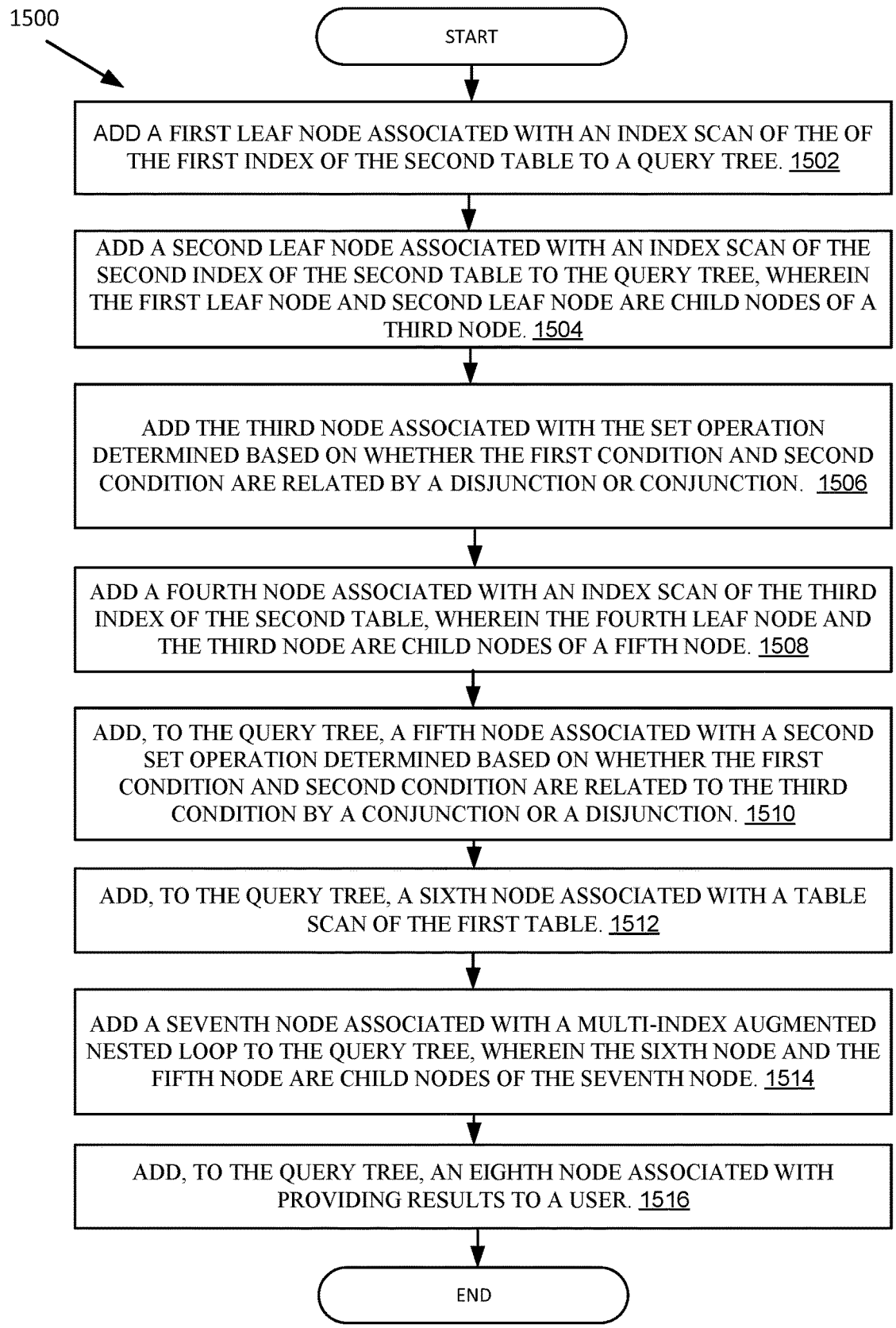
FIG. 15 is flowchart of an example method of creating a query tree for a complex, multi-index join according to one embodiment.

FIGS. 13-15 depict methods 1300, 1400, 1500 performed by the system described above in reference to FIGS. 1-3, 8, 10, and 11.

Referring now to FIG. 13, the method 1300 begins at block 1302. At block 1302, the query optimization module 302 receives a join query including a join operation (e.g. an inner join, left outer join, right outer join, full outer join, and a cross join) on a first table and a second table and including a first condition (e.g. Tab1.Col1=Tab2.Fld1) and a second condition (e.g. Tab1.Col2=Tab2.Fld2), where the first condition is based on a first index of the second table (e.g. Tab2.Fld1), and the second condition is based on a second index of the second table (e.g. Tab2.Fld2).

At block 1304, the query optimization module 302 determines a first result set by index scanning the second table (e.g. Tab2) using the first index as an index key (e.g. Tab2IdxFld1). At block 1306, the query optimization module 302 determines a second result set by index scanning the second table (e.g. Tab2) using the second index as the index key (e.g. Tab2IdxFld2).

At block 1308, the query optimization module 302 determines a third result set by applying a set operation to the first result set and the second result set. For example, the multi-index conjunction optimization module 314 applies a TID-Intersection set operation when the first and second condition are related by a conjunction operation. In another example, the multi-index disjunction optimization module 312 applies a TID-Union set operation when the first and second condition are related by a disjunction operation. At block 1310, the query optimization module 302 provides the third result set in response to the join query and the method 1300 ends.

Referring now to FIG. 14, the method 1400 begins at block 1402. At block 1402, the query optimization module 302 adds, to a query tree, a first leaf node associated with an index scan of the first index of the second table. At block 1404, the query optimization module 302 adds, to the query tree, a second leaf node associated with an index scan of the second index of the second table, wherein the first leaf node and second leaf node are child nodes of a third node. At block 1406, the query optimization module 302 adds, to the query tree, the third node associated with the set operation, the set operation determined based on whether the first condition and second condition are related by a conjunction, in which case the set operation is a TID-Intersect, or a disjunction, in which case the set operation is a TID-Union. At block 1408, the query optimization module 302 adds, to the query tree, a fourth node associated with a table scan of the first table. At block 1410, the query optimization module 302 adds, to the query tree, a fifth node associated with a multi-index augmented nested loop, wherein the third node and the fourth node are child nodes of the fifth node. At block 1412, the query optimization module 302 adds, to the query tree, a sixth node associated with providing results to a user.

Referring now to FIG. 15, the method 1500 begins at block 1502. At block 1502, the query optimization module 302 adds, to a query tree, adds a first leaf node associated with an index scan of the of the first index of the second table. At block 1504, the query optimization module 302 adds, to the query tree, a second leaf node associated with an index scan of the second index of the second table, wherein the first leaf node and second leaf node are child nodes of a third node. At block 1506, the query optimization module 302 adds, to the query tree, the third node associated with the set operation determined based on whether the first condition and second condition are related by a disjunction or conjunction. At block 1508, the query optimization module 302 adds, to the query tree, a fourth leaf node associated with an index scan of the third index of the second table, wherein the fourth leaf node and the third node are child nodes of a fifth node. At block 1510, the query optimization module 302 adds, to the query tree, the fifth node associated with a second set operation determined based on whether the first condition and second condition are related to the third condition by a conjunction or a disjunction. At block 1512, the query optimization module 302 adds, to the query tree, a sixth node associated with a table scan of the first table. At block 1514, the query optimization module 302 adds, to the query tree, a seventh node associated with a multi-index augmented nested loop, wherein the sixth node and the fifth node are child nodes of the seventh node. At block 1516, the query optimization module 302 adds, to the query tree, an eighth node associated with providing results to a user.

It should be recognized that, while FIGS. 13, 14 and 15 depict scenarios having the illustrated number of conditions and indices, the disclosure above extends to any number of conditions and indices.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment", "one implementation," or "an implementation" means that a particular feature, structure, or characteristic described in connection with the embodiment is included in at least one embodiment. The appearances of the phrase "in one embodiment" or "in one implementation" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    receiving, using one or more processors, a join query, wherein the join query includes a join operation on a first table and a second table and includes a plurality of conditions, the second table including a first index on a first portion of the second table and a second index on a second portion of the second table, the plurality of conditions including a first condition and a second condition, the first condition based on the first portion of the second table, and the second condition based on the second portion of the second table;
    generating, using the one or more processors, a query plan based on the join query, wherein the query plan uses two or more indexes in a plurality of indexes, the plurality of indexes including the first index and the second index, to perform two or more index scans prior to a set operation and applies a multi-index augmented nested loop join after the set operation, wherein the set operation is based on results of the two or more index scans, and the two or more index scans include a first index scan using the first index and a second index scan using the second index;

executing, using the one or more processors, the query plan, wherein executing the query plan includes:
performing the first index scan of the second table using the first index to obtain a first result set;
performing the second index scan of the second table using the second index to obtain a second result set;
determining a first intermediate result set by applying the set operation to the first result set and the second result set;
determining a second intermediate result set by performing a scan of the first table;
determining a final result set by applying a multi-index augmented nested loop join to the second intermediate result set and at least a portion of the first intermediate result set; and providing, using the one or more processors, the final result set in response to the join query.

2. The computer-implemented method of claim 1, wherein the first condition is based on a first non-indexed portion of the first table, the second condition is based on a second non-indexed portion of the first table and the scan of the first table is a table scan.

3. The computer-implemented method of claim 1, wherein the first condition and the second condition are based on a non-indexed portion of the first table and the scan of the first table is a table scan.

4. The computer-implemented method of claim 1, wherein the join operation includes at least one of: an inner join, a left outer join, a right outer join, a full outer join, and a cross join.

5. The computer-implemented method of claim 1, wherein the set operation is a union and the first condition and the second condition are related by a disjunction operation.

6. The computer-implemented method of claim 1, wherein the set operation is an intersection and the first condition and the second condition are related by a conjunction operation.

7. The computer-implemented method of claim 1, wherein the query plan comprises a tree including:
a first leaf node associated with the first index scan of the first index of the second table;
a second leaf node associated with the second index scan of the second index of the second table, wherein the first leaf node and second leaf node are child nodes of a third node;
the third node associated with the set operation, the set operation determined based on whether the first condition and the second condition are related by a conjunction or a disjunction;
a fourth node associated with the scan of the first table;
a fifth node associated with the multi-index augmented nested loop join, wherein the third node and the fourth node are child nodes of the fifth node; and
a sixth node associated with the final result set provided to a user responsive to the join query.

8. The computer-implemented method of claim 1, wherein the join query includes a third condition, the second table includes a third index on a third portion of the second table, and the third condition is based on the third portion of the second table, and wherein:
the query plan comprises a tree including:
a first leaf node associated with the first index scan of the first index of the second table;
a second leaf node associated with the second index scan of the second index of the second table, wherein the first leaf node and second leaf node are child nodes of a third node;
the third node associated with the set operation, the set operation determined based on whether the first condition and the second condition are related by a first conjunction or a first disjunction;
a fourth leaf node associated with an index scan of the third index of the second table, wherein the fourth leaf node and the third node are child nodes of a fifth node;
the fifth node associated with a second set operation determined based on whether the first condition and the second condition are related to the third condition by a second conjunction or a second disjunction;
a sixth node associated with the scan of the first table;
a seventh node associated with the multi-index augmented nested loop join, wherein the sixth node and the fifth node are child nodes of the seventh node; and
an eighth node associated with the final result set provided to a user responsive to the join query.

9. The computer-implemented method of claim 1, wherein the join query is a complex query including a first disjunction and a first conjunction.

10. The computer-implemented method of claim 1, wherein the first index of the second table is dynamically created.

11. A system comprising:
one or more processors; and
a memory storing instructions that, when executed by the one or more processors, cause the system to:
receive a join query, wherein the join query includes a join operation on a first table and a second table and includes a plurality of conditions, the second table including a first index on a first portion of the second table and a second index on a second portion of the second table, the plurality of conditions including a first condition and a second condition, the first condition based on the a first portion of the second table, and the second condition based on the second portion of the second table;
generate a query plan based on the join query, wherein the query plan uses two or more indexes in a plurality of indexes, the plurality of indexes including the first index and the second index, to perform two or more index scans prior to a set operation, applies a multi-index augmented nested loop join after the set operation, the set operation is based on results of the two or more index scans, and the two or more index scans including a first index scan using the first index and a second index scan using the second index;
execute the query plan, wherein executing the query plan includes:
perform the first index scan of the second table using the first index to obtain a first result set;
perform the second index scan of the second table using the second index to obtain a second result set;
determine a first intermediate result set by applying the set operation to the first result set and the second result set;
determine a second intermediate result set by performing a scan of the first table;

determine a final result set by applying a join to the second intermediate result set and at least a portion of the first intermediate result set; and provide the final result set in response to the join query.

12. The system of claim 11, the first condition is based on a first non-indexed portion of the first table, the second condition is based on a second non-indexed portion of the first table and the scan of the first table is a table scan.

13. The system of claim 11, wherein the first condition and the second condition are based on a non-indexed portion of the first table and the scan of the first table is a table scan.

14. The system of claim 11, wherein the join operation includes at least one of: an inner join, a left outer join, a right outer join, a full outer join, and a cross join.

15. The system of claim 11, wherein the set operation is a union and the first condition and the second condition are related by a disjunction operation.

16. The system of claim 11, wherein the set operation is an intersection when the first condition and the second condition are related by a conjunction operation.

17. The system of claim 11, wherein the query plan comprises a tree including:
- a first leaf node associated with the first index scan of the first index of the second table;
- a second leaf node associated with the second index scan of the second index of the second table, wherein the first leaf node and second leaf node are child nodes of a third node;
- the third node associated with the set operation, the set operation determined based on whether the first condition and the second condition are related by a conjunction or a disjunction;
- a fourth node associated with the scan of the first table;
- a fifth node associated with the multi-index augmented nested loop join, wherein the third node and the fourth node are child nodes of the fifth node; and
- a sixth node associated with the final result set provided to a user responsive to the join query.

18. The system of claim 11, wherein the join query includes a third condition, the second table includes a third index on a third portion of the second table, and the third condition is based on the third portion of the second table, and wherein the query plan comprises a tree including:
- a first leaf node associated with the first index scan of the first index of the second table;
- a second leaf node associated with the second index scan of the second index of the second table, wherein the first leaf node and second leaf node are child nodes of a third node;
- the third node associated with the set operation, the set operation determined based on whether the first condition and the second condition are related by a first conjunction or a first disjunction;
- a fourth leaf node associated with an index scan of the third index of the second table, wherein the fourth leaf node and the third node are child nodes of a fifth node;
- the fifth node associated with a second set operation determined based on whether the first condition and the second condition are related to the third condition by a second conjunction or a second disjunction;
- a sixth node associated with the scan of the first table;
- a seventh node associated with the multi-index augmented nested loop join, wherein the sixth node and the fifth node are child nodes of the seventh node; and
- an eighth node associated with the final result set provided to a user responsive to the join query.

19. The system of claim 11, wherein the join query is a complex query including a first disjunction and a first conjunction.

20. The system of claim 11, wherein the first index of the second table is dynamically created.

* * * * *